(12) United States Patent
Gu et al.

(10) Patent No.: US 12,350,888 B2
(45) Date of Patent: Jul. 8, 2025

(54) AI-POWERED AUTONOMOUS 3D PRINTER

(71) Applicant: THE REGENTS OF THE UNIVERSITY OF CALIFORNIA, Oakland, CA (US)

(72) Inventors: Grace Xiang Gu, Berkeley, CA (US); Zhizhou Zhang, Berkeley, CA (US); Zeqing Jin, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 255 days.

(21) Appl. No.: 17/638,076

(22) PCT Filed: Aug. 25, 2020

(86) PCT No.: PCT/US2020/047816
§ 371 (c)(1),
(2) Date: Feb. 24, 2022

(87) PCT Pub. No.: WO2021/041422
PCT Pub. Date: Mar. 4, 2021

(65) Prior Publication Data
US 2022/0281177 A1 Sep. 8, 2022

Related U.S. Application Data

(60) Provisional application No. 62/892,365, filed on Aug. 27, 2019.

(51) Int. Cl.
*B33Y 10/00* (2015.01)
*B29C 64/364* (2017.01)
(Continued)

(52) U.S. Cl.
CPC .......... *B29C 64/393* (2017.08); *B29C 64/364* (2017.08); *B33Y 10/00* (2014.12);
(Continued)

(58) Field of Classification Search
None
See application file for complete search history.

(56) References Cited

U.S. PATENT DOCUMENTS 11,915,419 B1\* 2/2024 Behrooz ................ G16H 50/20
2014/0048970 A1 2/2014 Batchelder et al.
(Continued)

FOREIGN PATENT DOCUMENTS

WO 2019125970 6/2019

OTHER PUBLICATIONS

Jin et al. "Autonomous in-situ correction of fused deposition modeling printers using computer vision and deep learning," Manufacturing Letters, vol. 22, Sep. 21, 2019, pp. 11-15.
(Continued)

*Primary Examiner* — Yung-Sheng M Tsui
(74) *Attorney, Agent, or Firm* — Miller Nash LLP

(57) ABSTRACT

A method of additive manufacturing to perform three-dimensional printing, capturing images of printed material, using a convolutional neural network to determine a state of the printing, and autonomously adjusting the three-dimensional printing as needed based upon the state of the printing. A system to perform autonomous additive manufacturing has a three-dimensional printer having a source of material, a nozzle connected to the source of material, and a print bed, a camera, and at least one processing element to execute instruction that cause the processor to receive images from the camera.

7 Claims, 24 Drawing Sheets

(51) Int. Cl.
*B29C 64/393* (2017.01)
*B33Y 30/00* (2015.01)
*B33Y 40/00* (2020.01)
*B33Y 50/02* (2015.01)
*B29C 64/106* (2017.01)

(52) U.S. Cl.
CPC .............. *B33Y 30/00* (2014.12); *B33Y 40/00* (2014.12); *B33Y 50/02* (2014.12); *B29C 64/106* (2017.08)

(56) References Cited

U.S. PATENT DOCUMENTS

| | | |
|---|---|---|
| 2015/0045928 A1 | 2/2015 | Perez et al. |
| 2015/0301517 A1 | 10/2015 | Chen et al. |
| 2016/0297110 A1 | 10/2016 | Wu |
| 2017/0259502 A1 | 9/2017 | Chapiro et al. |
| 2018/0012082 A1 | 1/2018 | Satazoda et al. |
| 2019/0299536 A1* | 10/2019 | Putman .................. B33Y 10/00 |
| 2020/0101670 A1* | 4/2020 | Howell ................ G06V 10/454 |
| 2020/0303038 A1* | 9/2020 | Luo ........................ G16B 40/20 |
| 2022/0088878 A1* | 3/2022 | Zeng ...................... B33Y 50/02 |
| 2023/0294173 A1* | 9/2023 | Freytag .............. G05B 23/0243 |
| | | 700/118 |

OTHER PUBLICATIONS

International Search Report and Written Opinion, PCT/US2020/047816, Nov. 19, 2020, 11 pages.

Jin et al. "Automated Real-Time Detection and Prediction of Interlayer Imperfections in Additive Manufacturing Processes Using Artificial Intelligence," Advanced Intelligent Systems, 2019, 1900130, 7 pages.

* cited by examiner

AI-POWERED AUTONOMOUS 3D PRINTER

CROSS REFERENCE TO RELATED APPLICATIONS

This application is a 371 of International Application No. PCT/US2020/047816, filed Aug. 25, 2020, which claims priority to and the benefit of U.S. Provisional Application No. 62/892,365 filed Aug. 27, 2019, the contents of both of which are incorporated herein by reference in their entirety.

TECHNICAL FIELD

This disclosure relates to three-dimensional (3D) printing, more particularly to 3D printing using artificial intelligence (AI).

BACKGROUND

Additive manufacturing has made huge strides in the past decade, systems are now capable of fabricating multiscale, multimaterial and multifunctional designs. Fused deposition modeling (FDM) technology, the most widely used additive manufacturing process due to its ease of use and low cost, slices a model into thin layers and then deposits polymer filament to sketch the contour and fill the internal area layer-by-layer. A particular implementation of FDM technology, fused filament fabrication (FFF), uses polymer filaments to build prints layer by layer.

One limitation of FDM/FFF printers, however, involves in-plane printing issues such as under-extrusion and over-extrusion. Over-extrusion occurs when the printer extrudes too much material that may cause dimensional inaccuracy, layer drooping, stringing, oozing, blob, and jams. Under-extrusion occurs when the printer extrudes too little filament that may cause gaps, missing layers, insufficiently small layers, or even little dots or holes in layers. Other defects may arise, including inter-plane delamination, and warping in the first layer.

These common issues are hard to eliminate and can accumulate to cause these various print defects. The capability of detecting regional defects along with their spatial and temporal information is critical for industrial applications to effectively reduce material consumption and create parts of high quality. The defects mentioned above can lead to significant imperfections and create barriers for full industrial adoption of additive manufacturing. Currently, using experienced operators to manually and iteratively tune printing parameters such as printing speed, flow rate, and fan speed, remains the most effective method to correct problems and obtain optimal print quality and requires extensive human experience. These do not scale to the industrial level.

As a result, researchers have developed various approaches to improve print quality including tool path optimization and mathematical modeling of printing parameters. Other approaches include analyzing how printing parameters, such as layer thickness, road width, and speed of deposition, affect the quality, real-time and in-situ monitoring of the manufacturing process, and assessment of the mechanical properties using non-destructive methods.

Machine learning aided methods have been applied in recent years to a wide range of fields such as autonomous driving, face recognition, big data prediction, and materials design. It has also been utilized in the field of additive manufacturing to inspect printing conditions. Advanced methods such as combining three-dimensional digital image correlation (3D-DIC) with real-time monitoring for fused filament fabrication (FFF) printing has also been explored. However, the previous defect detection techniques either largely depend on the mathematical calculation based on the image or require expensive experimental equipment such as a DIC camera. Moreover, the previous systems require pauses or stops during the printing process to conduct any print judgments and are not capable of real-time correcting printing conditions.

These new methods include embedded acoustic sensors, computer vision, and machine learning, the newly integrated systems can lean the internal relationship between the sensor signals and working condition information. However, these approaches have issues in localizing the defects both accurately and efficiently to allow for corrections during the manufacturing process.

DETAILED DESCRIPTION OF THE EMBODIMENTS

The embodiments here involve an autonomous system incorporating advanced machine learning algorithms to classify and detect printing issues. The system then self-corrects with optimal processing parameters to reliably 3D-print high-performance materials at fast rates and resolutions with enhanced dimensional accuracy. In one embodiment, a real-time monitoring and refining platform uses convolutional neural networks (CNN), which is a commonly used deep learning algorithm with images as input. CNN transforms an image to an array of numbers that represent the image's category. The model that describes the mapping is trained and used to predict results for new unseen images.

Figure 1B:
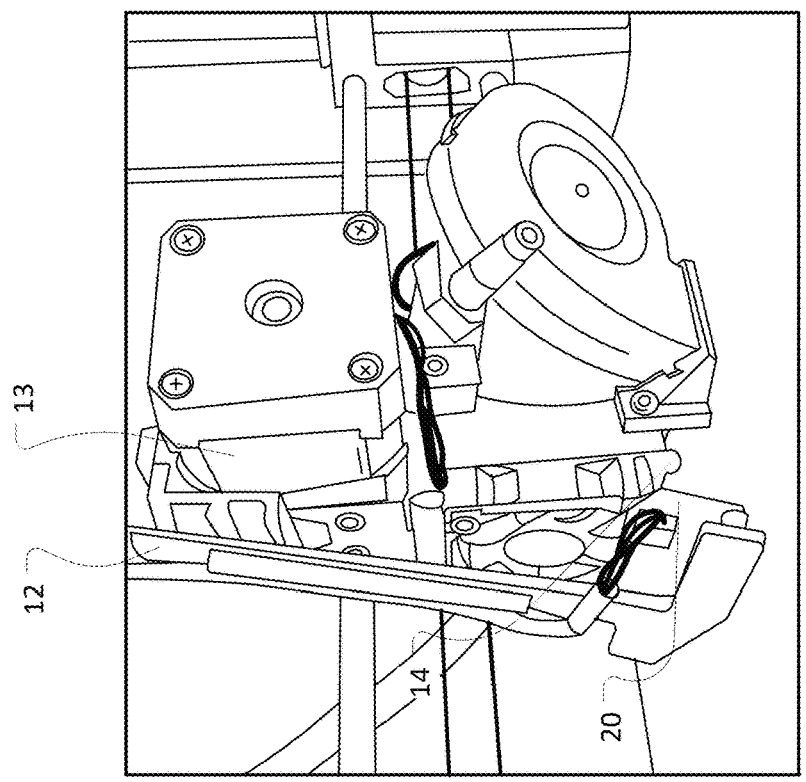
FIGS. 1a and 1b show embodiments of a 3D printer having a camera and camera mount used to perform autonomous printing.
Figure 1A:
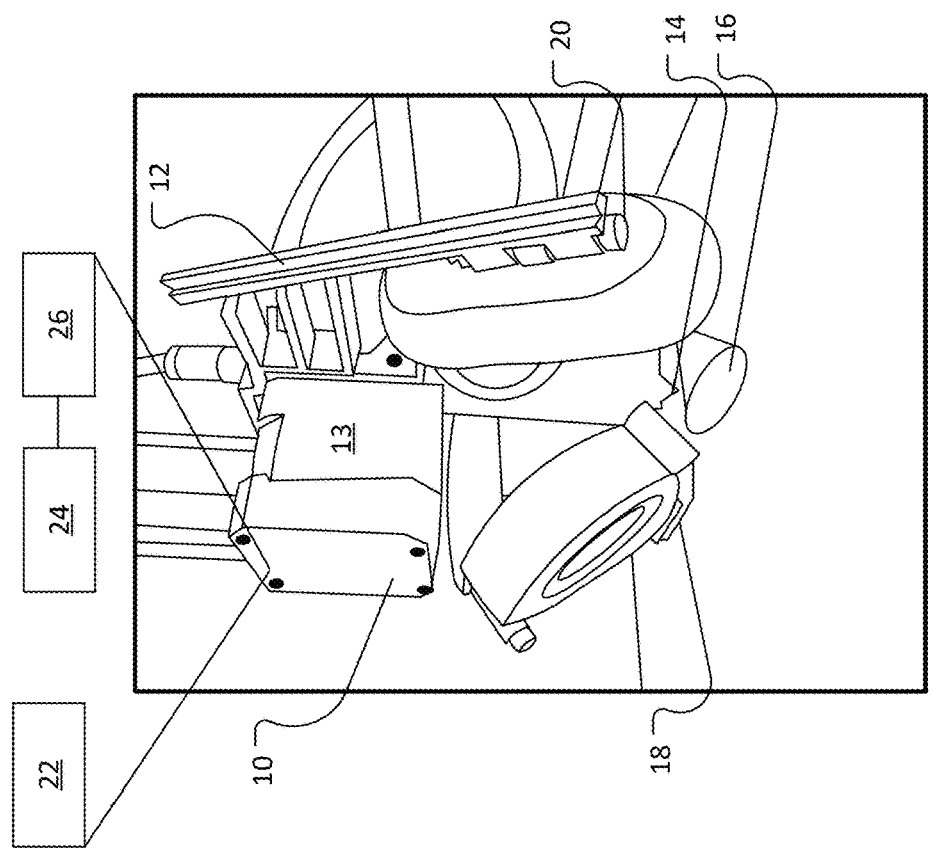

FIG. 1a shows an embodiment of a 3D printing system. A 3D printer 10 has a custom camera mount 12 fixed on top of the extruder cap 13. This suspends the camera 20 and provides a fixed monitoring view during printing. The nozzle 14 dispenses product into the monitored region 16. In one embodiment, the printer 10 has a fan mount 18 that is modified to allow a better viewing angle. The printer also has a source of material 22 and at least one processing element 24, shown in an exploded view of FIG. 1a. The processing element 24 has a memory. The memory may comprise one memory or multiple memories, such as one memory to store the code used by the processor to cause the processor to execute instructions, as well as storing the images used by the processing element. FIG. 1b shows an alternative embodiment of the apparatus with the reference numbers referring to the same components as in FIG. 1a.

The processing element 24 may consist of a processing element that can operate the printing system. The processing element may contain the elements of the neural networks described below, or may connected to a separate processing element, such as 26. In an example, the processing element 26 may be a field programmable gate array (FPGA) programmed to physically implement the neural network nodes and layers. The processing element 24 contain both the print control processing element and the neural network processing element. In either case the processing element 24 will be referred to here as "providing access to" or "accessing" the neural network, as the print control processing element communicates with the neural network.

In one embodiment, prints were produced by a PRUSA i3 MK3 FDM printer with polylactic acid (PLA) filament, but the embodiments here are useful for any 3D printer. In one embodiment the camera 20 was a Logitech C270 with its front panel removed so that the focal length can be adjusted for the best image quality at the print region beneath the nozzle 16.

Figure 2:
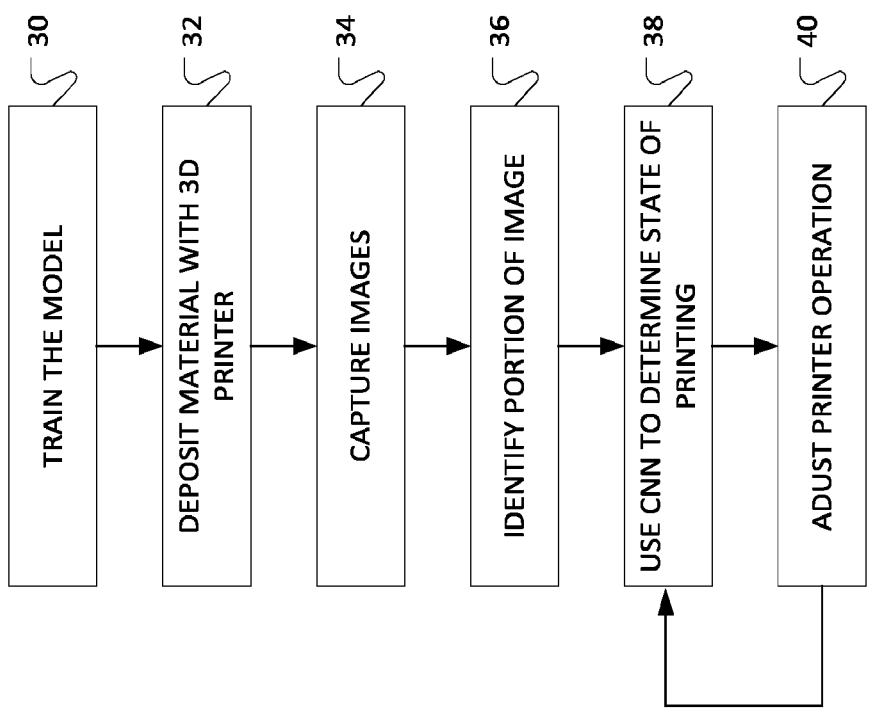
FIG. 2 shows a flowchart of an embodiment of a process for autonomous three-dimensional (3D) printing.

The embodiments of machine learning based 3D-printing system generally consists of two parts: a post-training procedure and an in-situ real-time monitoring and refining section. FIG. 2 shows a flowchart of an embodiment of a process. This process may occur in the order shown, or some of the sub-processes may occur in a different order. The discussion below covers embodiments directed to embodiments of detecting and correction intra-place defects of over or under extrusion, and inter-plane defects such as delamination and warping. The discussion also covers different embodiments of identifying regions in the images that contain the image data of interest to the CNN.

First, a CNN classification model is trained at 30. In one embodiment, the training uses a deep residual network, such as ResNet, with a learning process for image recognition that is 50 layers deep. After the completion of the training period, during the 3D-printing process during the printer deposits the material at 32, real-time images are continuously fed into the model at 34. The model classifies the images to obtain the current printing condition at 38. The model may also identify the region of interest in the image at 36, or the region may be preclassified before the data is provided to the CNN. The CNN determines the state of the printing at 40.

In many embodiment, the print condition is one of over extrusion, under extrusion or good quality. In others, the print condition may consist of delamination and/or warping. If an issue such as over-extrusion is detected, adjusting commands will be automatically executed to change printing parameters via a 3D-printer controlling GUI (graphical user interface) at 40. Some embodiments use an embedded, continuous feedback detection and monitoring loop where images with new settings will iterate until a good quality condition is achieved.

Figure 3:
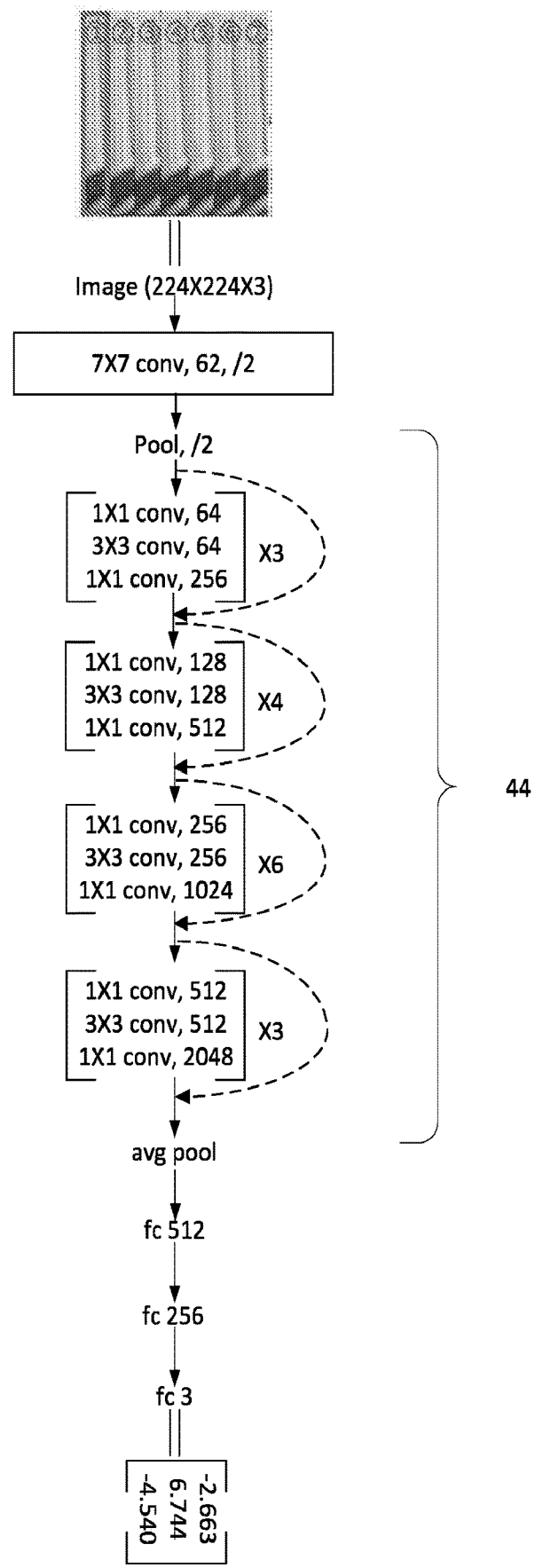
FIG. 3 shows a graphical representation of a modified CNN model

FIG. 3 shows a graphical representation of a modified CNN model. The image over the printed 'slice' is augmented by further images at 42. In the embodiment shown, six more images allow matching to the model used. The resulting arrays of numbers are processed to produce a vector of three elements at 46. Some embodiments use a CNN model for the training process that is a pretrained ResNet 50, which contains 16 residual blocks shown at 44. In each block, there are three convolutional layers. With one more convolutional layer after input and another fully connected layer before output, there are a total of 50 layers in the pretrained model. To better adapt a desired output with the model, the final layer may deleted and connected with another two layers to decrease the output size from 2048 to 3. Therefore, the output will be a vector of three by one 46. For each category, around 120,000 images are prepared, where 70% of them are randomly picked as training data and the rest of them are treated as validation or testing data.

Figure 4:
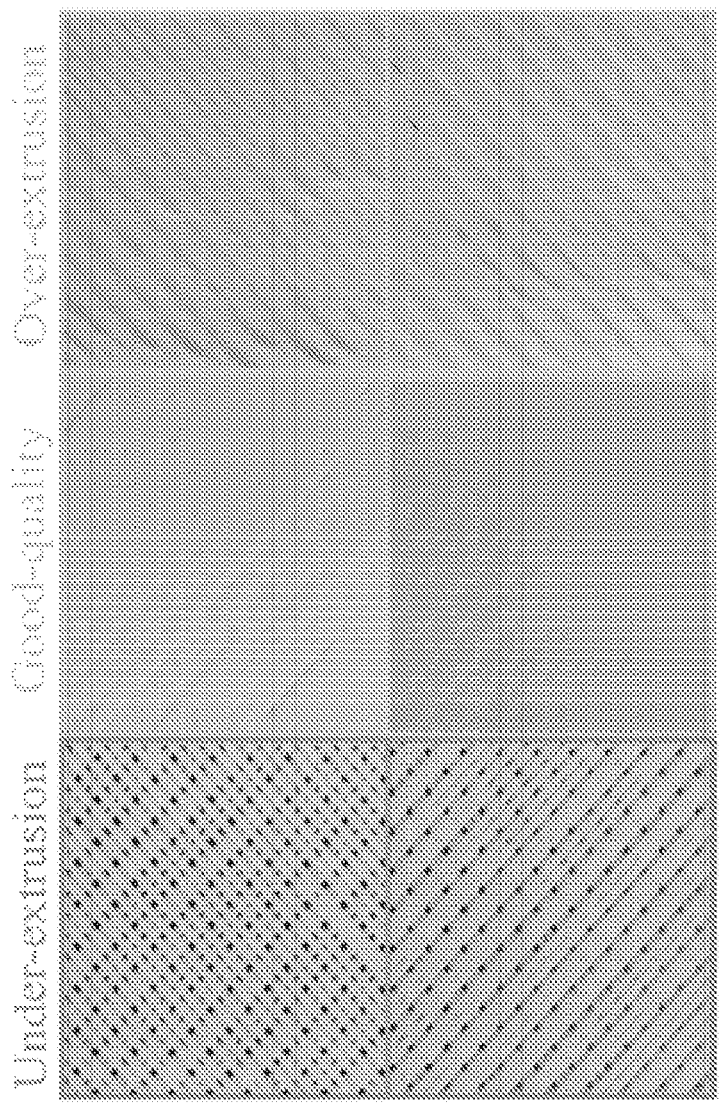
FIG. 4 shows examples of different print conditions.

Videos are recorded and labeled with the corresponding categories: 'Good-quality', 'Under-extrusion' and 'Over-extrusion'. For each category, two levels of condition are generated by printing a five-layer block with size 50 mm×50 mm×1 mm. Representative topography 3D-printed samples for all three categories are shown in FIG. 4.

After the machine learning model is trained, it will be transferred into the monitoring and refining system. In one experiment, 20 real-time images were captured every 6 seconds and fed into the model during the training process, therefore 20 classification results would be obtained. The mode of these 20 results may be regarded as the current printing condition since it helps eliminate inaccurate classification that may occur when based solely on a single image.

In this experiment, if five successive over or under-extrusion judgments appeared, adjusting commands were sent automatically via a print control GUI that can connect, control and communicate with the 3D-printer. After one command was sent, five following updated judgments were recorded to decide whether the printing condition had improved. If the printing condition had not improved, further adjustments were forwarded to the printer and the procedure was repeated until five continuous Good-Quality results were finally received by the system. Referring back to FIG. 2, this is shown as the feedback loop from 40 to 36.

Figure 5:
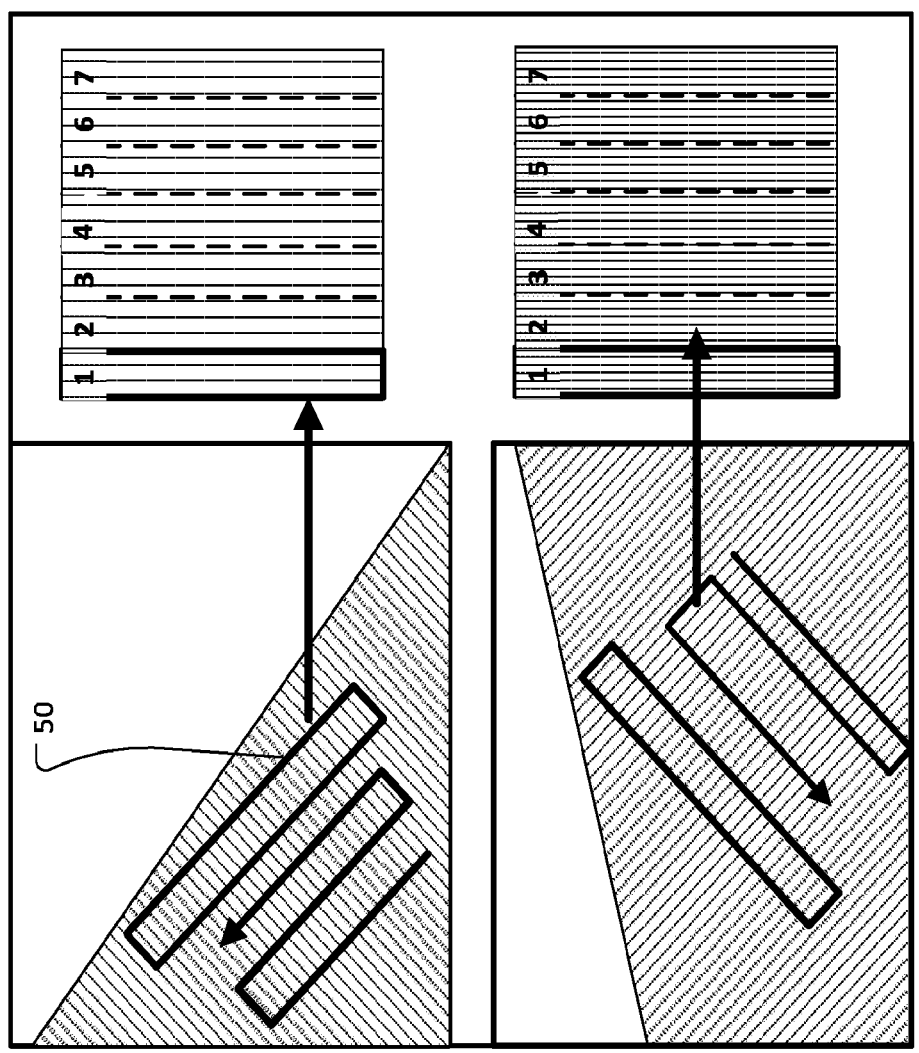
FIG. 5 shows an examples of print windows.

The core component of the auto-correction system is a classification model which detects whether undesirable extrusion exists. Before training the model, further image processing is required for the collected video data. In one embodiment, full sized images were transformed from the video at 20 frames per second. Since there are two perpendicular printing directions, in each direction, a fixed window is extracted along the newly printed lines near the nozzle as shown at 50 in FIG. 5. One embodiment used a square 32×224 window.

Figure 6:
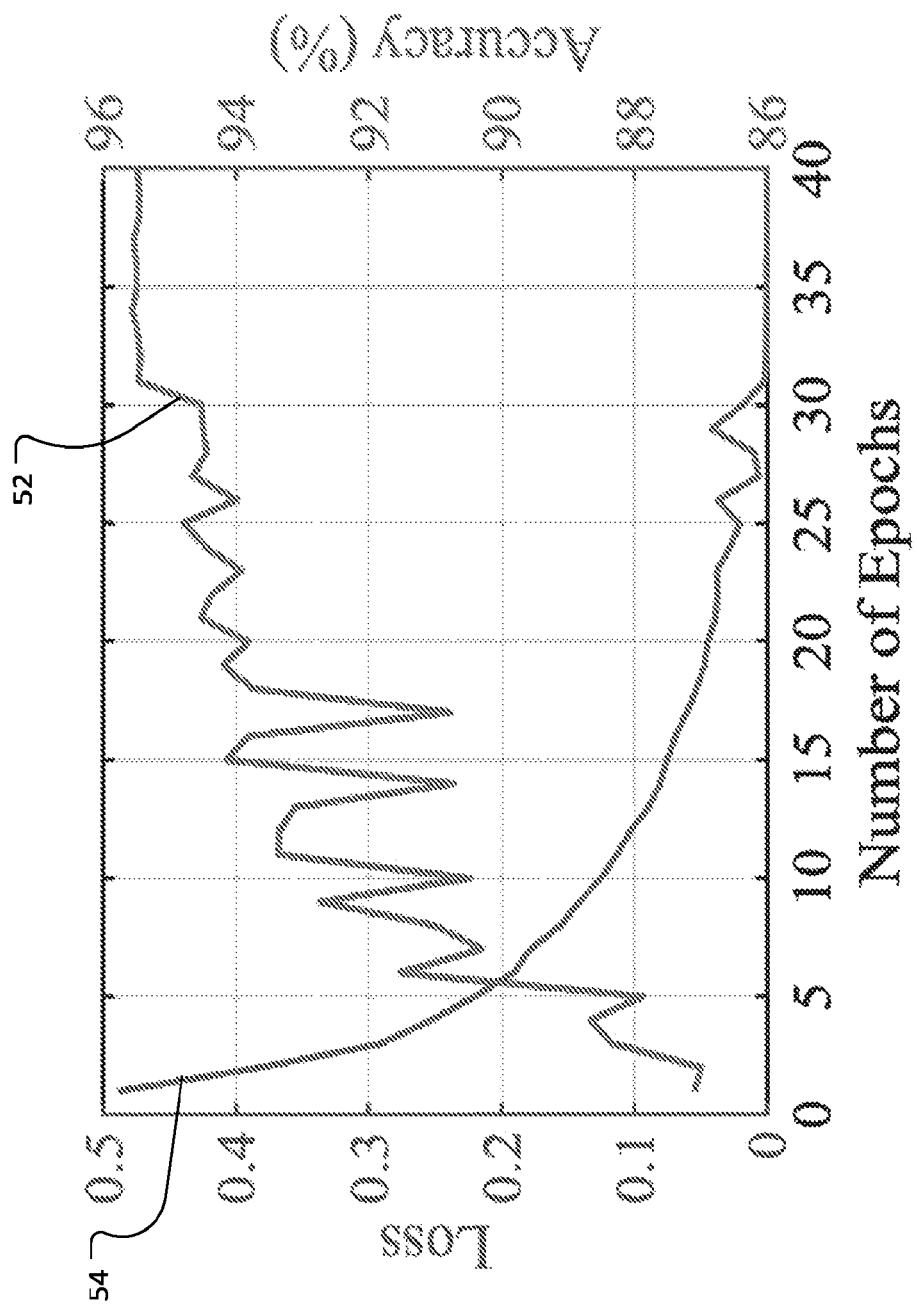
FIG. 6 shows a graphical representation of accuracy vs. a number of training epochs.
Figure 7:
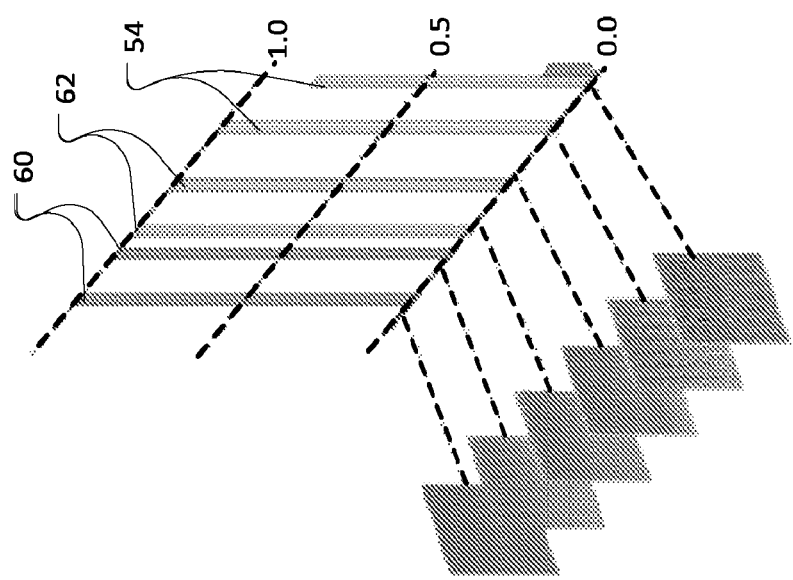
FIG. 7 shows a graphical representation of the probability of an image in three output categories.

In order to match the input image size of the machine learning model, each image may be augmented some number of times and concatenated together to form an image. In one embodiment, the image was augmented 6 more times and the concatenation formed a 224×224 image. In order to obtain an accurate model, the whole image data is trained for a sufficient number of epochs. The loss rate 54 and accuracy 52 against epoch number for the experiment above are shown in FIG. 6. The accuracy 52 curve converges to 98% after training for 40 epochs.

As mentioned above, the trained model takes an image as input and returns a 3×1 vector. The sum of each vector's three entries is normalized to 1 by a Softmax function, the normalized exponential function, such that they indicate the probability of an image to fall into the corresponding category. The final classification result of an image is determined by the resulting columns, with the highest column where columns 60, 62, and 64 column representing the probability of Under-extrusion, Good-quality, and Over-extrusion respectively.

Figure 8:
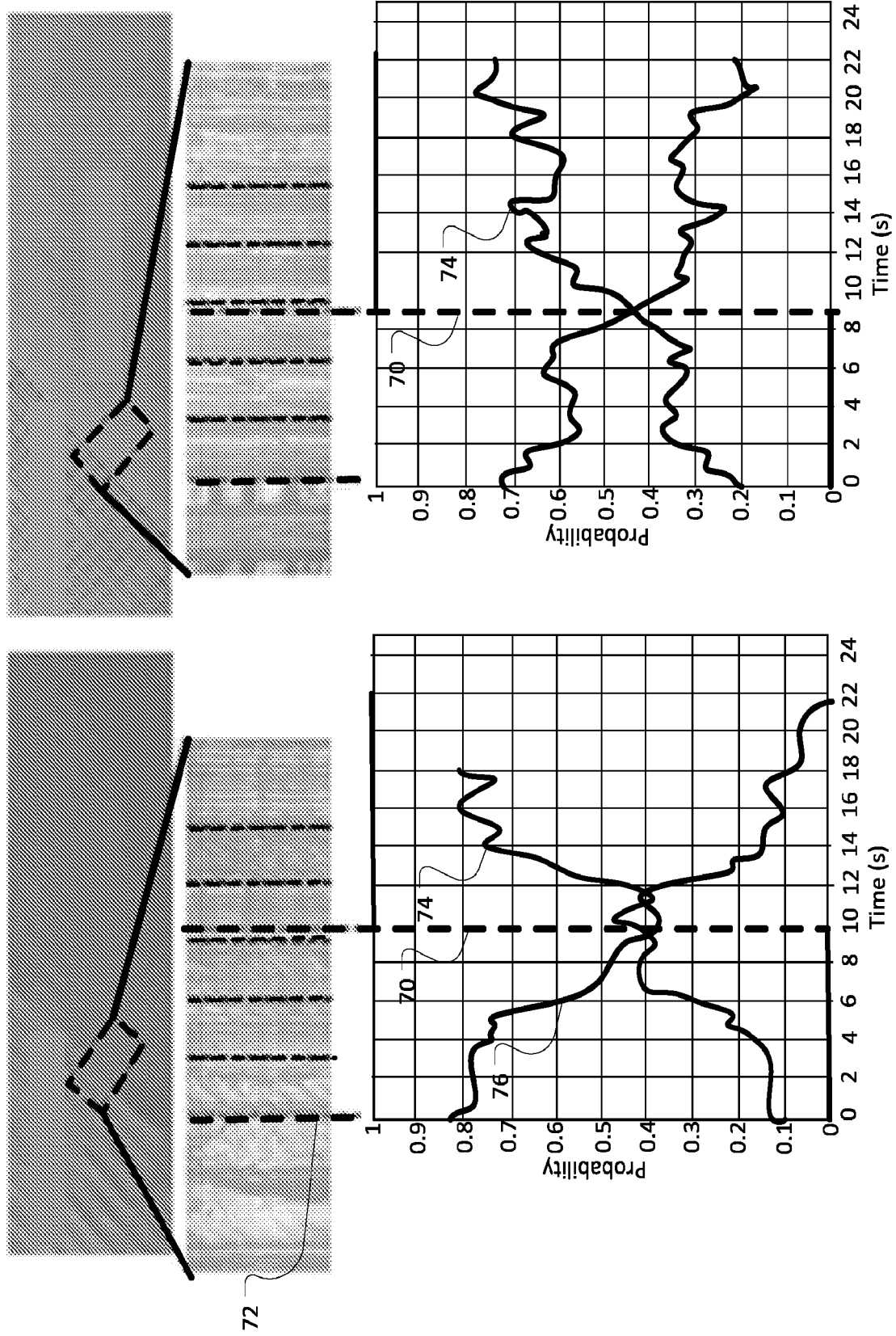
FIG. 8 shows results of responses when detecting over- and under-extrusion conditions.

In addition to accuracy, a quick response is equally essential for the platform to identify print quality variation and adjust its performance before continuing the print. Therefore, response time is measured when the printer corrects Under-extrusion or Over-extrusion conditions. During the printing process, when an Over- or Under-extrusion condition is detected, two transition states from bad to good are presented in FIG. 8. At t=0 s, marked by short vertical dashed line 72, the first Good-quality raster is printed. The curves show the probability of Good-quality and Over- or Under-extrusion images against time, where curve 76 represents Over-extrusion, curves 74 represent Good-quality and curve 78 represents Under-extrusion. As discussed previously, this probability is calculated through averaging the results of the images in a nearest predetermined number of seconds, such as 6 seconds, to reduce the uncertainties from the photos captured at the margin of the print.

When the value of good-quality probability surpasses another one, the collection of images will be further classified as 1, otherwise 0, represented by horizontal red lines at the top or bottom edges of the two plots. The transitions from Over-extrusion and Under-extrusion to Good-quality are first detected by the monitoring system at t=9.8 s and 8.6 s, which are marked by long dash lines 70 in the figures. The interval between every two neighboring black dash lines is 3 seconds which is the time needed to print one raster. Normally, it takes three rasters for human individuals to recognize improving print quality. Therefore, the model is capable of distinguishing the shift equally or even faster than a human can under both cases. Besides the detection delay of the monitoring system, the firmware delay, the time it takes for the extrusion motor to execute the command and start to print modified rasters, is also a non-negligible component of the total response time. For example, this firmware response time highly depends on the FDM printer and can vary from 12 to 18 seconds. The overall response time of the in-situ correction system is thus determined by the sum of the two delays.

The defects of over and under extrusion occur within a single layer, referred to here as intra-plane defects. Other types of defects occur inter-plane, such a delamination and warping. A gap between the current nozzle height and the print surface causes delamination. Generally, the solution to this issue adjusts the nozzle offset value properly in the first place, where the adjustment of this variable is known as the first-layer calibration.

A system such as those shown in FIGS. 1a and 1b may be used to allow for real-time monitoring and adjustment of the nozzle offset. Typically for these types of defects, the configuration of 1b may work better, with the system of 1b having all the same components as the system of 1a, just not necessarily all shown in 1b.

Figure 9:
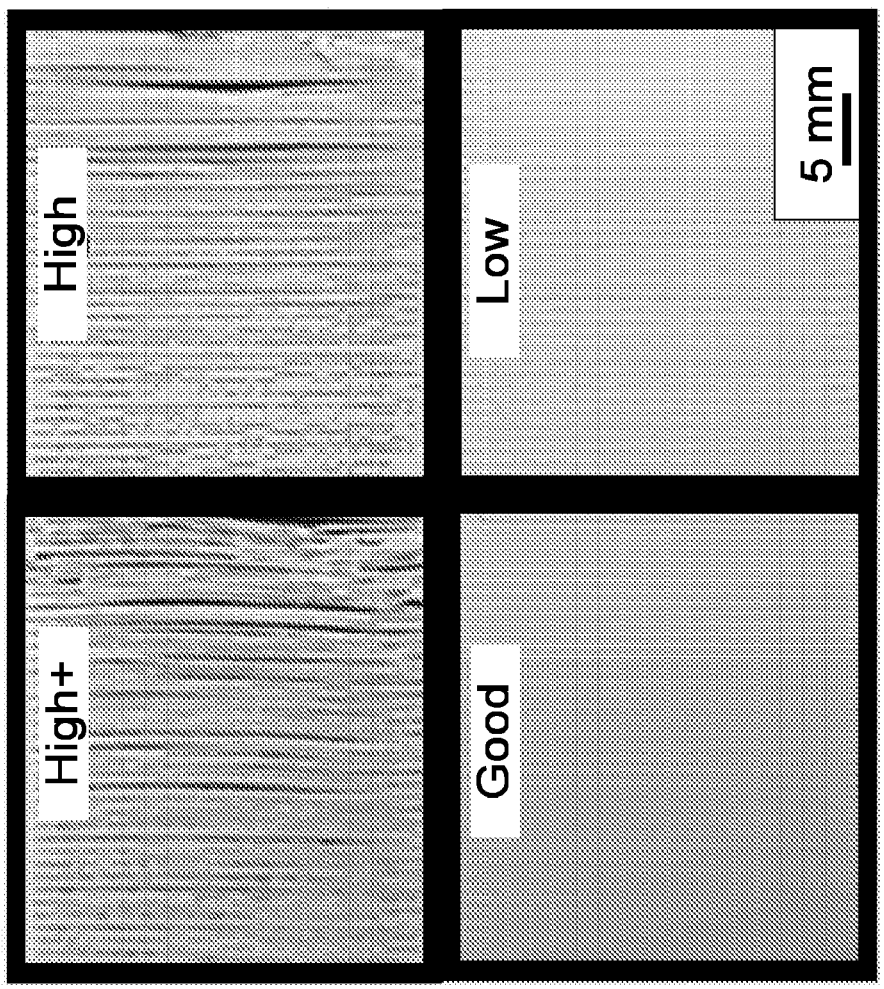
FIG. 9 shows images representing four categories of nozzle height.

The offset nozzle height is classified into four categories: "High+," "High," "Good," and "Low." Since the nozzle cannot be adjusted to be lower than the print bed itself, no lower category is considered in the classification. FIG. 9 shows images representing the four categories, with a scale bar of 5 mm. It can be seen that the "High" nozzle height will result in poor adhesion conditions between the filament and print bed. Moreover, a "High+" nozzle height intensifies the delamination even worse as shown in the left upper box compared with the right upper box. On the contrary, a "Low" nozzle height causes filaments to be extruded all around due to the restricted space beneath the nozzle and hence leading to a nonuniform surface condition shown in the lower right box.

After defining the condition of the four cases, the system collects image data collected during the printing process. A customized first-layer calibration file for printing control, such as a GCODE file is made, which sends commands to the printer to deposit ten single rasters directly on the print bed. Each raster is parallel and separated 5 mm from each other to provide the proper angle to balance image capturing quality and image collecting efficiency. During the image data acquisition, within each category, nozzle height is adjusted in three levels to ensure full coverage of the category. The specific values of each nozzle height are shown in Table 1.

TABLE 1

| Nozzle Ht. (mm) | "High+" | "High" | "Good" | "Low" |
|---|---|---|---|---|
| Level 1 | −0.96 | −1.04 | −1.12 | −1.20 |
| Level 2 | −0.98 | −1.06 | −1.14 | −1.22 |
| Level 3 | −1.00 | −1.08 | −1.16 | −1.24 |

One should note that there is a 0.04 mm gap between each category which may be caused by the print bed not being perfectly horizontal. For each level in one category, 900 images are captured continuously during the printing of the calibration model (the 10 rasters). Among all the image data, approximately 5% of them are not useful since they are captured during the idle transition path between parallel rasters. As there may be some slight vibration from the camera mount and variation of the external environment, each image is augmented into four images with the following details. First, a fixed 224×224 solid line "extraction box" 80 is chosen as the reference of interest. Then, a dashed square box 82 in the same size is extracted randomly from a uniform distribution within 10 pixels at the upper-right corner of the box 80 as shown in cycle 1. Finally, the same extraction procedure is repeated at the remaining three directions for generality: upper-left, lower-left, and lower-right. To sum up, each category has around 900×4×3=10,800 images altogether, and 30% of them are randomly picked out as validation data set, whereas the rest are grouped as training data. To ensure the applicability of our classification model, testing images are collected separately on a different day. For each category, one raster is printed with the nozzle height adjusting from level 1 to level 3 uniformly according to Table 1, and a yellow box representing the focused area is extracted; these images are treated as the testing data set.

Figure 12:
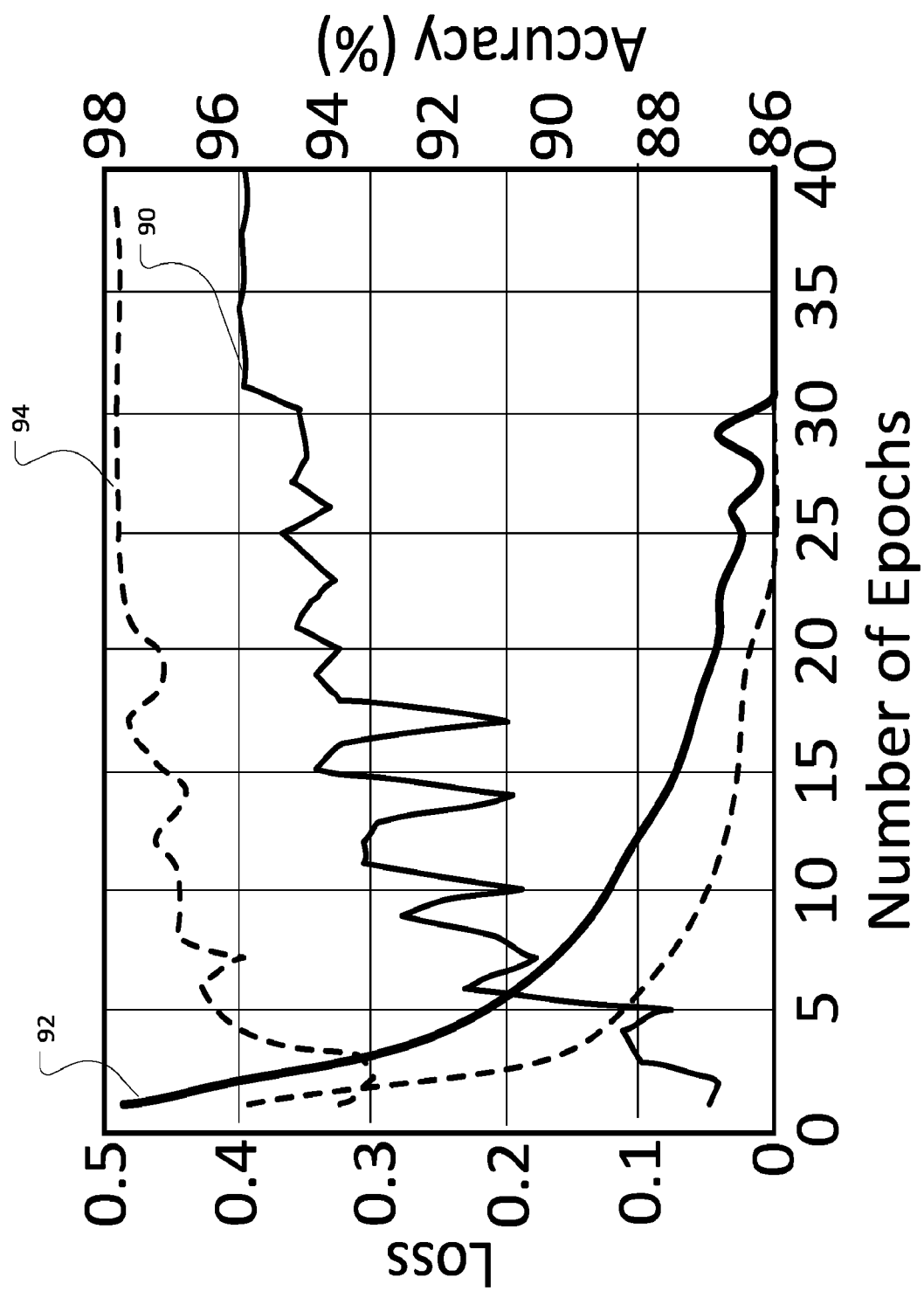
FIG. 12 shows a graph of number of epochs versus loss and accuracy.

After preparing all the needed image data sets, the training data set is fed into a convolutional neural network (CNN) model for training, and the accuracy is evaluated on the validation data set by the updated model after each epoch. Here, a pretrained residual network such as the ResNet model, is applied with its final layer removed and two layers of fully-connected layer added to scale down the output to a vector with four elements. The CNN used here may be the same as the one discussed above, but reconfigured to output the four element. The training procedure terminates when the accuracy of the validation data set reaches convergence after 40 epochs. The loss, curve 92, and accuracy, curve 90, against the number of epochs are shown by solid curves in FIG. 12. The curve 90 indicates a 95.5% accuracy for our classification model based on the validation data set. Suppose that the 5% of meaningless data are randomly classified into the four categories with the same probability, the highest theoretical accuracy achievable is 96.25%, where the rest of the 3.75% accuracy comes from the three-fourths of the incorrectly categorized not useful images. The results of the improved model is shown by curve 94.

Figure 13:
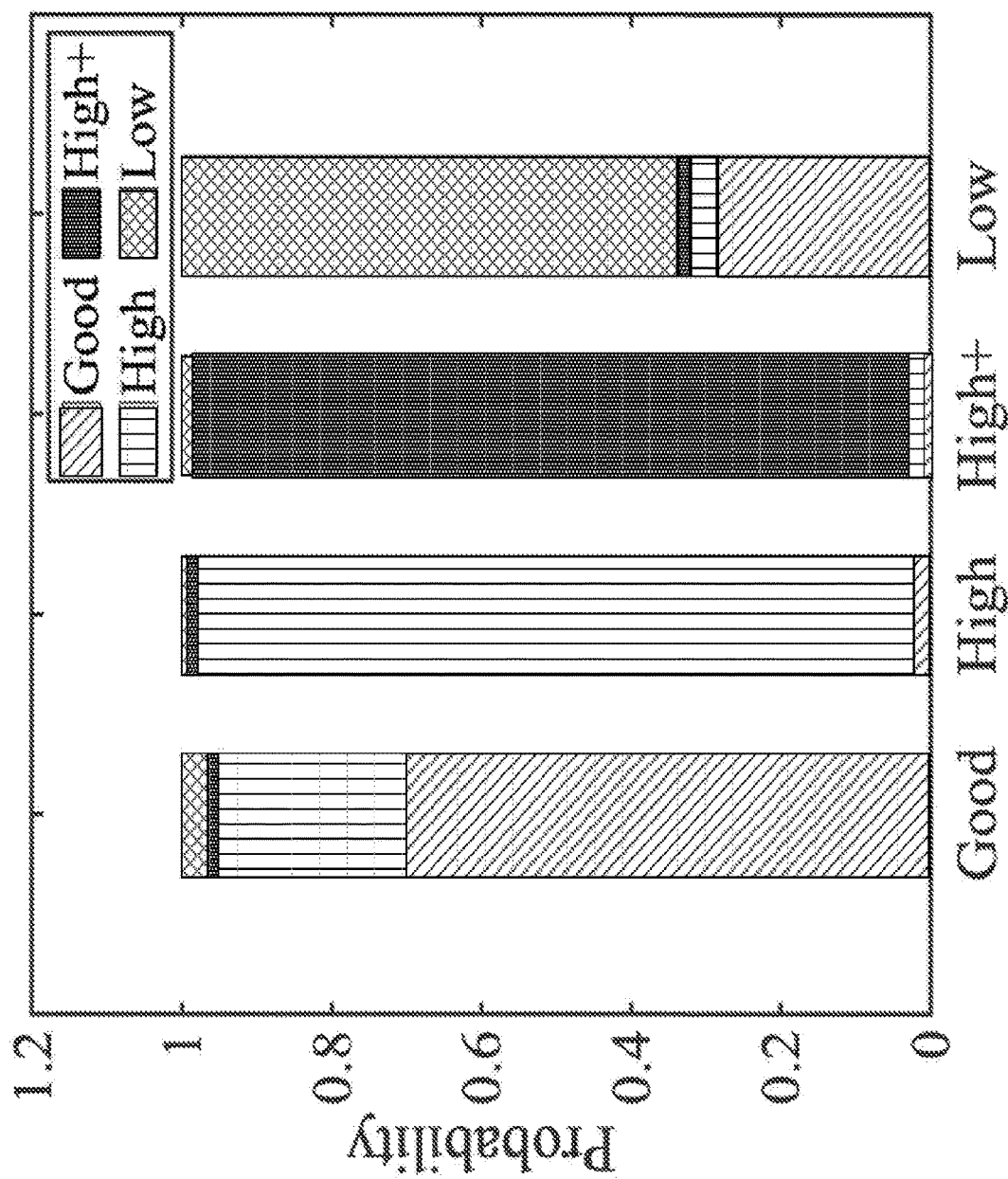
FIG. 13 shows a bar graph of probability results.

With the converged trained CNN model obtained, its performance is evaluated on the testing data set. The result of the accuracy for the testing data set is: "Good"=70%; "High"=96.8%; "High+"=97.7%; and "Low"=65.5%. To interpret the low accuracy on the "Good" and "Low" category, the output vector is transferred by a Softmax function that normalizes the sum of the vector elements to 1 and represents the probability of an image belongs to which category. The mean value of the normalized vector is calculated for each category, and the results are shown by a bar chart in FIG. 13. Comparing the two data sets, both "High" and "High" categories reach a high accuracy, whereas "Good" and "Low" categories have a lower confidence of accuracy in the testing data set. It can be seen that under the "Good" category, images have a higher chance to be viewed as "High" as these two categories are adjacent. Similarly, in terms of "Low" category, images have a higher tendency to be regarded as "Good."

Figure 10:
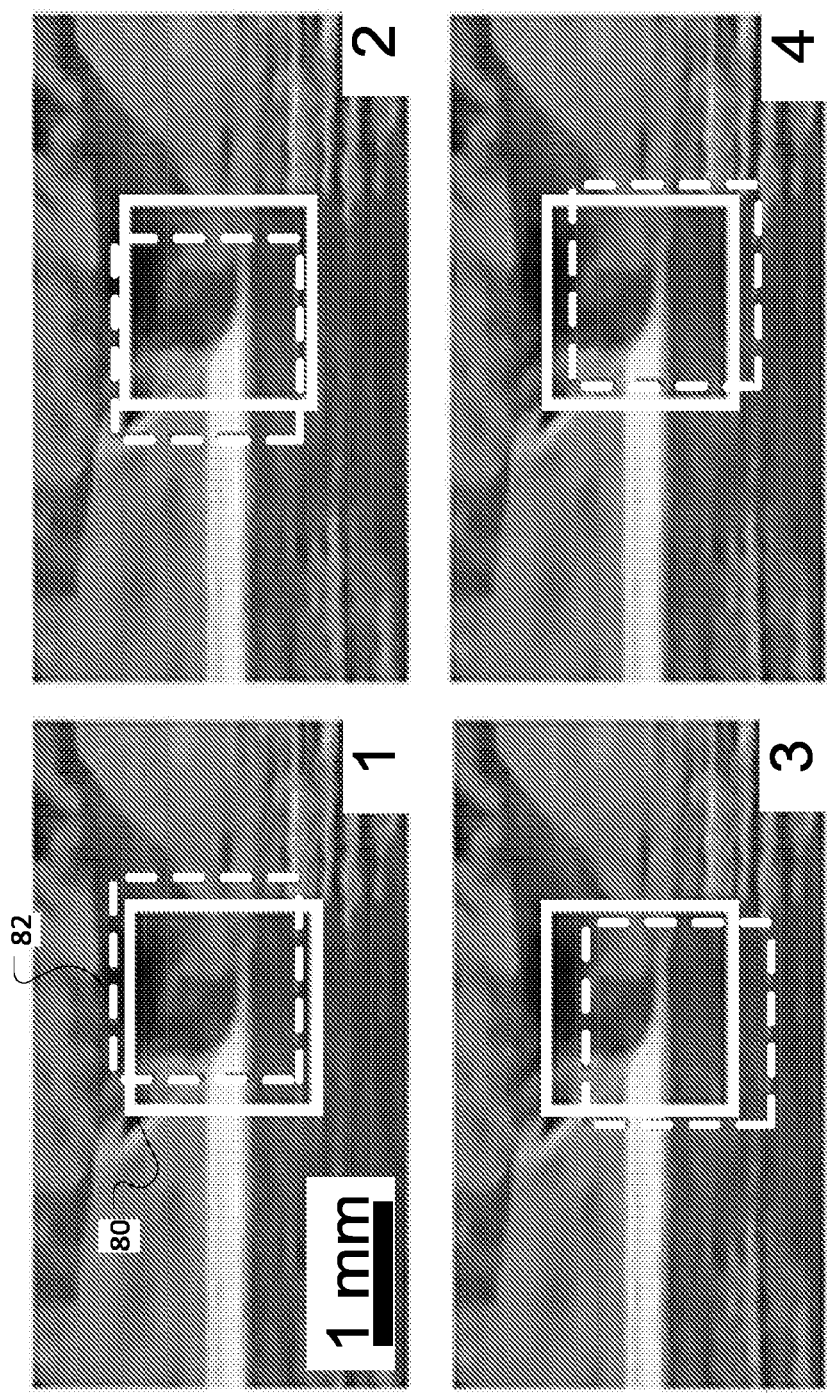
FIG. 10 shows images of nozzles.
Figure 11:
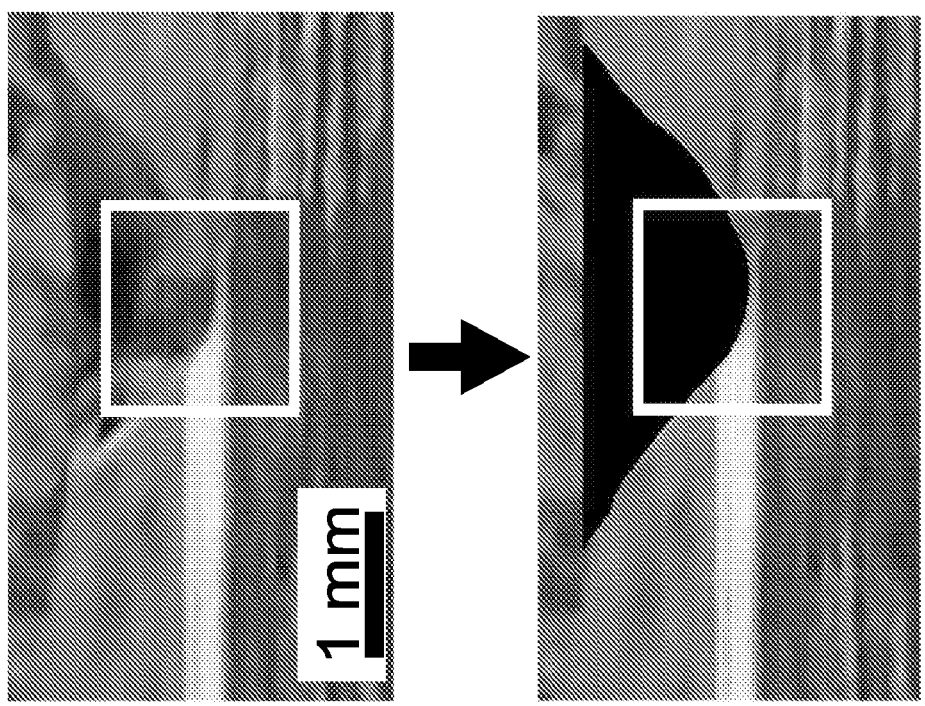
FIG. 11 shows images of nozzles with masking.

One of the reasons attributing to the low accuracy seen in the "Low" and "Good" categories is that extruded materials that fall under these two categories are usually both flat and uniform, making it difficult to distinguish between the two. The only feature to differentiate between the two categories is from the raster width and a slight tilt at the margin of the raster. Whereas when the categories of "High" and "High+" are compared, the lack of feature difference in "Low" and "Good" can direct the CNN model to fit the noise of the training data. To resolve the overfitting issue, it is believed that the main noise causing the low accuracy in these two categories can be attributed to the nozzle condition difference. It can be seen that in the extracted images such as those shown in FIG. 10, the nozzle occupies almost half of the space, and the surface conditions may change differently after each printing. Filaments, dust, and oil residues may attach to the nozzle. In addition, the 5% of meaningless data may also be another source of error in the actual testing process.

To further improve our model and structure, the 5% of data which tend to be blurry images during idle nozzle traveling are divided out as a fifth category called "Null." In addition, to eliminate the nozzle condition variation effects, images are preprocessed by using edge detection to mask the nozzle area into a black color before training and testing. The training results based on the validation data set can be seen in the dashed curves in FIG. 12. This shows that the accuracy curve converges faster and better than the previous model, which increased the overall accuracy from 95.5% to 97.8%.

Figure 14:
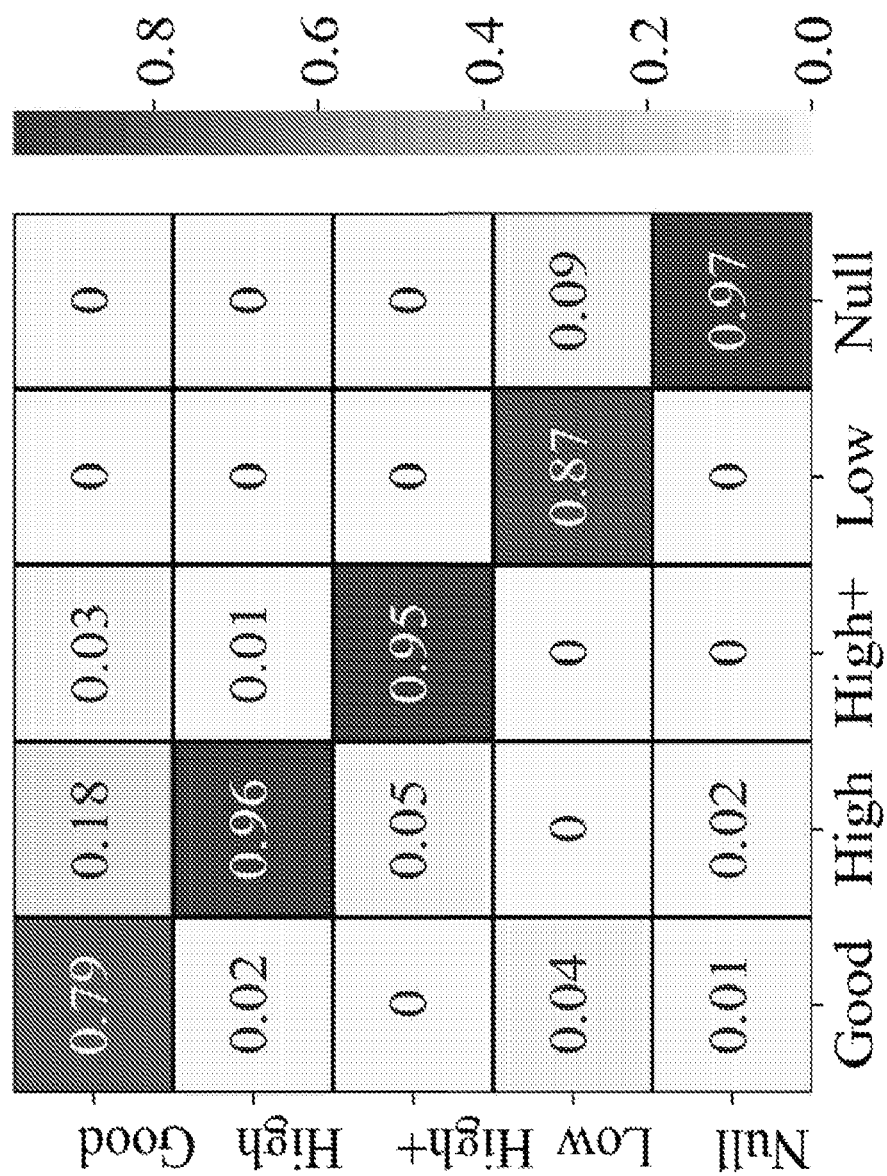
FIG. 14 shows a confusion matrix.

A confusion matrix that represents the result of the testing data set is shown in FIG. 14 to provide an intuitive interpretation of the distribution. The overall accuracy can be calculated as the average value on its diagonal which is 91.0%, where the accuracy is increased by 8.5% compared to the previous model. If the data are treated as "Valid" and "Null" in two categories, where "Valid" is the combination of "High+," "High," "Good," and "Low" category, the matrix can be transformed into Table 2.

TABLE 2

| | | Predicted Class | |
|---|---|---|---|
| | | Valid | Null |
| Actual Class | Valid | 0.98 | 0.02 |
| | Null | 0.03 | 0.97 |

Table 2 shows that the model has an accuracy of 97.5% to distinguish correctly between valid and null images and that the refined model shows considerable improvement when it comes to dealing with null data and varying nozzle conditions in the image. In addition, this extra fifth category helps us remove null data on the fly during the actual implementation of the trained algorithm in real-time printing situations. Other extrusion-based methods and 3D-printing technologies that have layer-by-layer transitions such as PolyJet and selective laser sintering (SLS) will also have the existence of null data when taking camera-based images. This monitoring method of adding an additional fifth category of null data will be applicable to other systems and be able to discard on the fly not useful data in real time.

One should note about the different factors that may influence the results. First, in terms of how geometry or color of the part may affect the results of the system, the experiments used a fixed Gcode file and unchanged white filament that both constrain and standardize the calibration process. The advantage of this standard calibration process is that it ensures easy adaptation to other systems and also reduces the effects of different shapes or colors of the printed part that is fabricated.

Second, the quality of the image data is believed to be another important parameter within the model as it is believed that improved image quality will potentially improve the model accuracy by providing more pixel information within the same extraction box. To improve the image quality, enhanced image processing algorithms such as super resolution (SR) can be applied. SR techniques have been shown in the literature to construct high-resolution images from several low-resolution ones by increasing high-frequency components and removing the degradations.

Third, the type of filament material and type of printing process, where different materials will cause disparate features in the image and the image acquiring location will cause disparate features in the image and the image acquiring location will vary for different types of printing processes. The monitoring process used here may apply to other types of materials, such as such as acrylonitrile butadiene styrene (ABS), and printing processes as long as the materials can be extruded or jetted in a layer-by-layer process and camera-based images can be obtained as a result. An interesting extension of this work may apply the machine learning driven monitoring system of the embodiments here to print a variety of different types of materials, from very soft to very stiff, with different printing processes, from extrusion-based to binder jetting.

Figure 15:
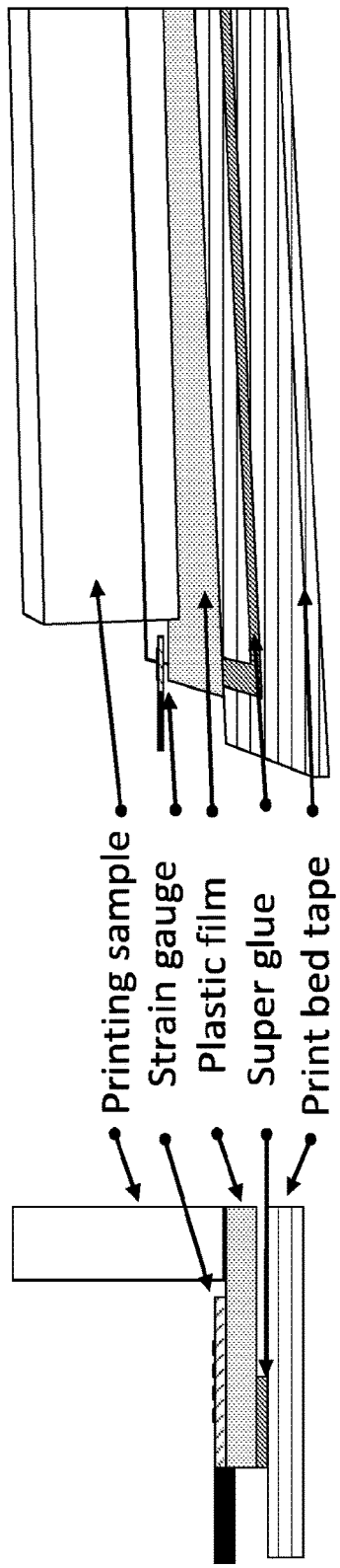
FIG. 15 shows an embodiment of a print sample with strain gauges.

Another interlayer issue in AM includes warping. In the embodiments, the method to predict warping is conducted by a setup established on the print bed based on strain gauges. In one experiment, print bed tape is peeled off from its plastic protective film and stuck to the print bed to prevent any contamination. Second, a smaller size of plastic film, but larger than the printing sample, is fixed to the print bed tape along its perimeter with an adhesive as shown in the light gray layer at the right part of FIG. 15. Third, the first strain gauge is fixed on the plastic film with the rear half of it glued exactly on the ring of superglue in the last step. In this case, any small expansion of the plastic film caused by the printing sample deformation can be detected by the strain gauge. The cross-sectional configuration is shown in the left part of FIG. 15. Finally, the third step is repeated at the other side of the plastic film and is denoted as Strain gauge 2.

Figure 16:
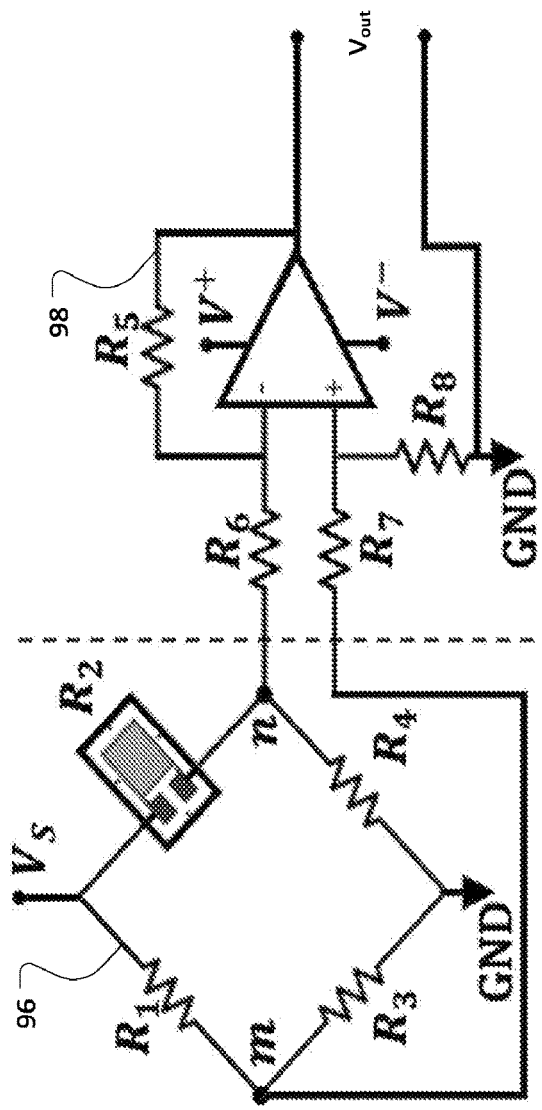
FIG. 16 shows an embodiment of a detection circuit.

Since the elongation of the thin film is very small, a sensitive measuring and signal amplifying system is needed. Here, a combined application of the Wheatstone bridge 96 and amplifier circuit 98 is established and shown in FIG. 16. During the printing, the voltage signal $V_{out}$ may be collected by a microcontroller and corresponding strain curve against time is calculated and plotted in real time. Nozzle height information is recorded at the same timestamp via an interface that communicates with the 3D printer. Table 3 shows some example values for the components.

TABLE 3

|  | R1(Ω) | R2(Ω) | R3(Ω) | R4(Ω) | R5(Ω) | R6(Ω) | R7(Ω) | R8(Ω) | V⁺/V⁻/V$_s$(V) |
|---|---|---|---|---|---|---|---|---|---|
| Gauge 1 | 120.1 | 120.0 | 119.9 | 119.9 | 100.1 | 1.001 | 0.997 | 100.5 | +12/−12/+5 |
| Gauge 2 | 119.8 | 119.9 | 119.7 | 119.6 | 101.0 | 0.997 | 1.000 | 100.2 | |

The voltage difference across m and n in a Wheatstone bridge, denoted by $V_{mn}$, can be expressed by:

$$V_{mn} = \left(\frac{R_3}{R_1+R_3} - \frac{R_4}{R_2+R_4}\right) V_s \quad (1)$$

The right part of the circuit is an ideal difference amplifier, where $R_5=R_8$ and $R_6=R_7$. The output voltage transferred to Arduino Vout is given by:

$$V_{out} = \frac{R_5}{R_6} V_{mn}. \quad (2)$$

Inserting Equation (1) into Equation (2), and taking the variation of $R_2$, one obtains:

$$\delta V_{out} = \frac{R_4 R_5 V_s}{R_6(R_2+R_4)^2} \delta R_2. \quad (3)$$

The Gauge Factor (GF) approximately equals a constant of 2 and has the following relationship $$GF = \frac{\Delta R_2 / R_2}{\varepsilon} \approx 2, \quad (4)$$

where $\Delta R_2$ is the resistance change of the strain gauge and $\varepsilon$ is the strain. One can express the strain in terms of output voltage difference and other constant variables as follows:

$$GF = \frac{1}{GF} \frac{R_6(R_2+R_4)^2}{R_2 R_4 R_5} \frac{\Delta V_{out}}{V_s}, \quad (5)$$

where $\Delta V_{out}$ is the difference in the current output voltage and initial steady-state value.

In one embodiment, with all the measurement settings prepared, two rectangular blocks with different percentages of infill are printed and two sets of data are collected. Since warping is mainly caused by the accumulated residual strain as the more layers stack up, the data in the time domain are then mapped into the layer number according to the recorded nozzle height information.

Figure 17:
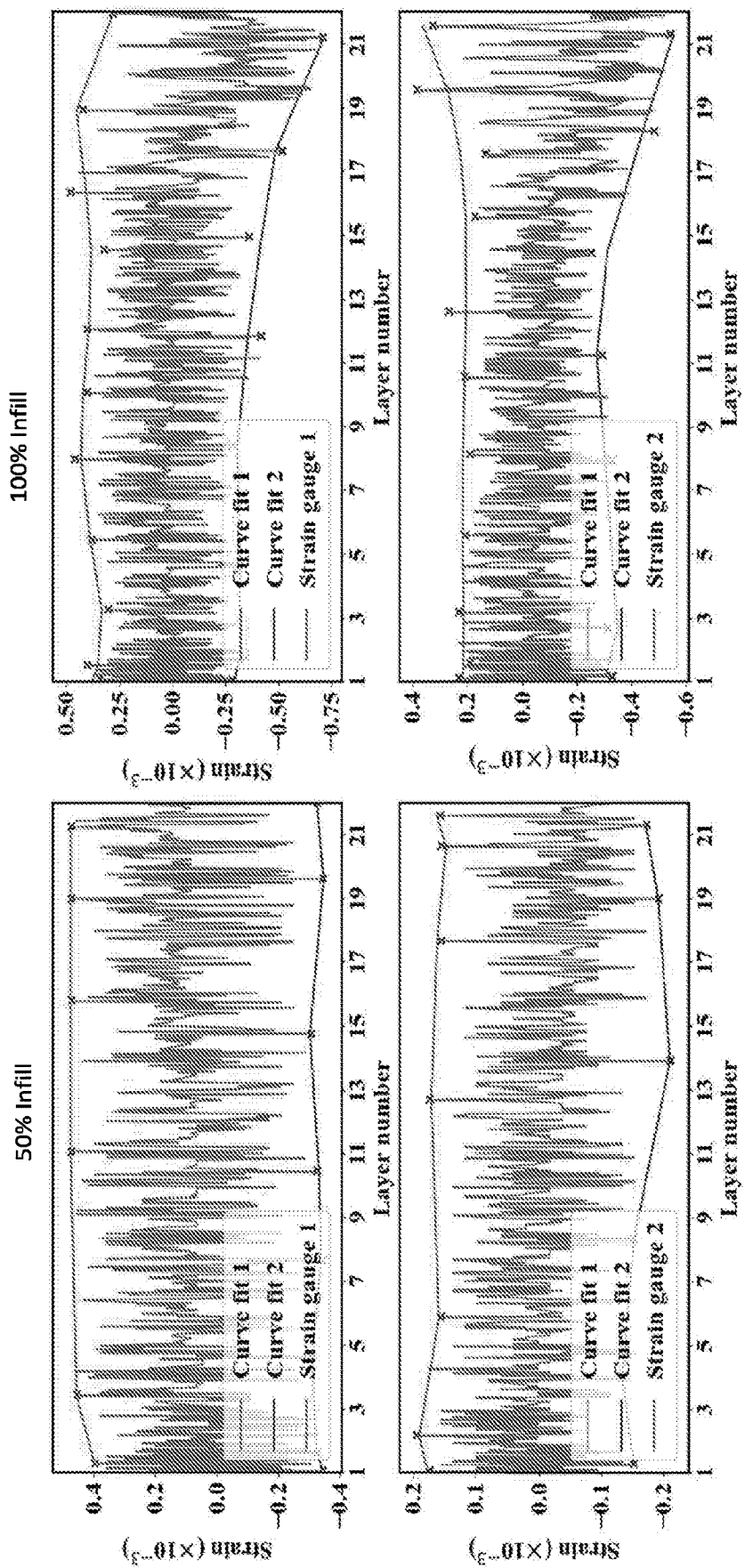
FIG. 17 shows graphical representations of strain gauge results.
Figure 18:
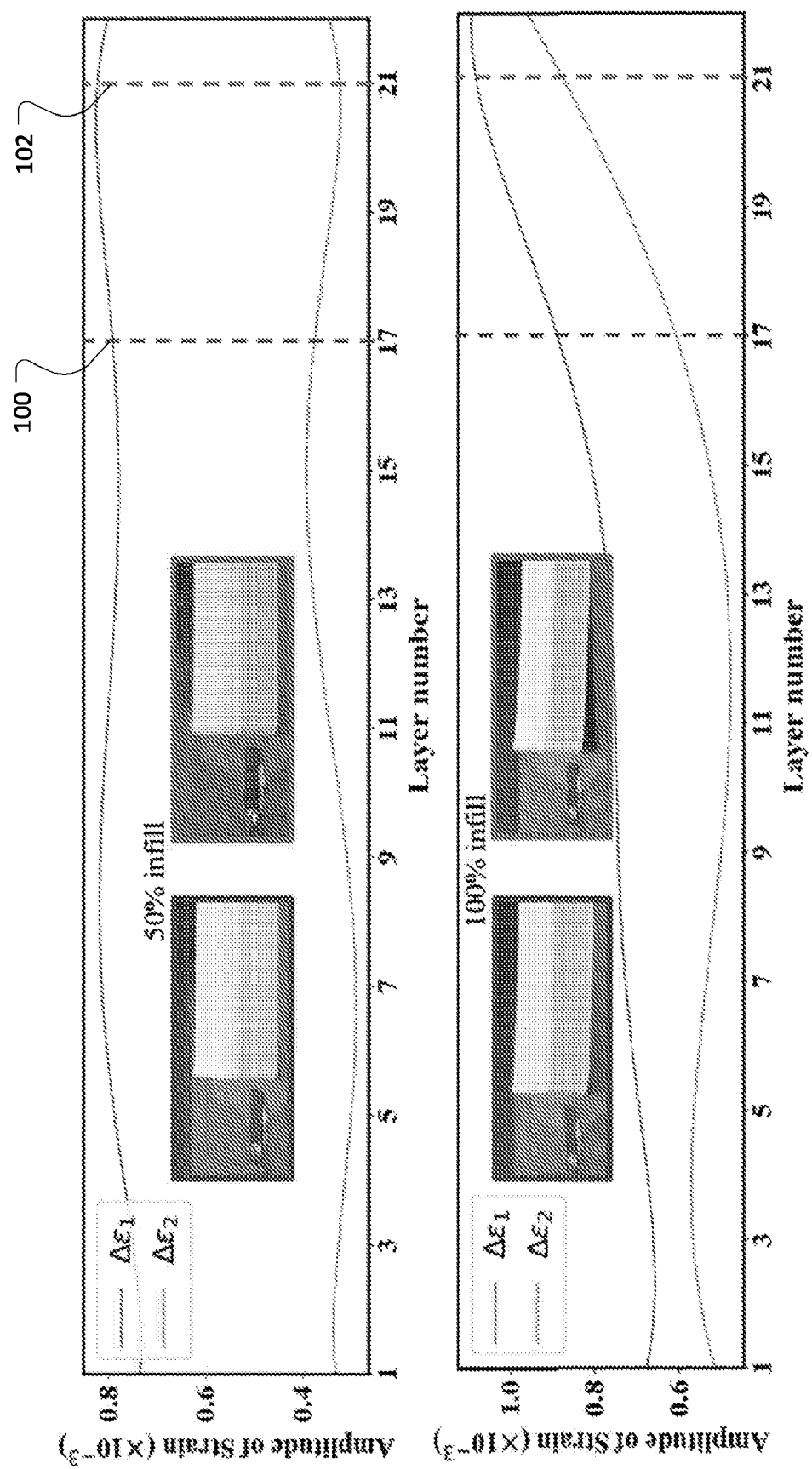
FIG. 18 shows a graph of strain by layer number.

Two sets of results on both Strain gauge 1 and Strain gauge 2 are shown in FIG. 17 with a plot of strain against layer number and an envelope curve fitting of the data. Local maxima and minima are picked at a certain interval, and polynomial curve fittings are implemented on those points. Here, the amplitude of strain (Δc) means the difference of the upper boundary (upper curve at top of graph) and the lower boundary (lower curve at bottom of graph). From the plot, it can be hypothesized that the amplitude of strain is steady for the 50% infill printing object while expanding for the 100% infill one. To further probe the variation of the strain signal, the amplitude of strain against layer number curve is plotted for both cases in FIG. 18.

The warping conditions on strain gauge 1 side are also shown in the figure at layer numbers 17 and 21 shown by vertical lines 100 and 102, respectively. On the one hand, for the 50% infill printing object, there is no sign of warping at both layer heights. On the other hand, in terms of the 100% infill printing sample, slight warping is shown at layer 17 and severe warping occurs at layer 21. The findings are consistent with the amplitude of the strain curve, and in other words, the whole experimental setup is able to show the condition and tendency of warping according to the amplitude of strain. Since the accumulation of internal stress during printing is irreversible, once a slight warping condition happens, continuing printing will be a waste of time and material. By setting a threshold, which can be defined as the ratio of current and initial amplitude of strain, a prediction of warping can be realized.

Taking strain gauge 1 in 100% infill sample as an example, at layer 17, the amplitude of strain is about $0.85 \times 10^{-3}$, and the average of first five layers is taken as the initial value of the amplitude of strain which is about $0.68 \times 10^{-3}$. Therefore, the ratio between the aforementioned two values, which equals 1.25, can be regarded as the threshold of predicting warping. Different from the fluctuating strain pattern of the 100% infill sample, this ratio varies between 0.90 and 1.20 throughout the entire printing process of the 50% infill sample. The value of the threshold is indeed dependent on the shape and dimension of the printing sample which requires further study; therefore, future work includes predicting warping based on the ratio analyzed from the input of a given CAD model.

This embodiment uses the system to detect and predict delamination and warping issue in real time based on the trained machine-learning model and strain measurement. The framework of this embodiment may also be applied to other materials and AM systems to improve the process with less human interaction.

The above discussion uses the methodology of locating the correct region where defects may occur in the images being analyzed by the CNN. In another embodiment, a change can be made to the approach and the CNN used to allow for a more accurate determination of the location of the region in the images, for both the intra-layer and inter-layer defects discussed above.

The embodiments here again use detailed spatial information of in-plane anomalies based on real-time images captured by a camera attached to the extruder. The embodiments use two detection methods including precise localization and semantic segmentation are conducted in both local and global frameworks. Specifically, a local framework refers to the angle of view from the camera and a global framework refers to the coordinate system based on the print bed of the printer. Localization uses bounding boxes to outline the loose location of the defects while semantic segmentation applies masks to shade the exact area of interest. For the localization problem, solutions are inspired by object detection methods applied in the autonomous vehicle industry. A one-stage algorithm, such as a modified YOLO (You Only Look Once) v3 algorithm, detects the previous layer and current layer defects using bounding boxes. Compared to the two-stage detectors where a set of the potential area is predicted by the first model and a second classifier is then trained based on the region candidates, one-stage models directly predict the bounding boxes and their confidence in a faster and more efficient way.

In semantic segmentation, the aim is to understand the image in pixel-wise level and segment the areas for different categories. In one embodiment, a modified DeepLabv3 architecture realizes semantic segmentation for the previous layer and current layer conditions using colored masks. One embodiment uses an atrous, or dilative, convolution structure. A pre-trained model is used in each task since it keeps the feature extraction at the front part of the model and only the end part of it is required for training.

After the semantic segmentation model is trained, predictions of pixel-level quality distribution are made on every input frame of images. Layer-wise images in the global framework can be rebuilt based on coordinate transformations between the local framework and the printer coordinate system. Hence, a layer-wise quality profile for the printing process is achieved in the global framework. The embodiments provide development of a multi-scale framework capable of detecting defects locally in real-time printing, realization of an efficient anomaly detection model that can decrease the response time of defects recognition, and integration of layer-wise quality profiles that can aid in the monitoring and correction of additive manufacturing systems.

Figure 19:
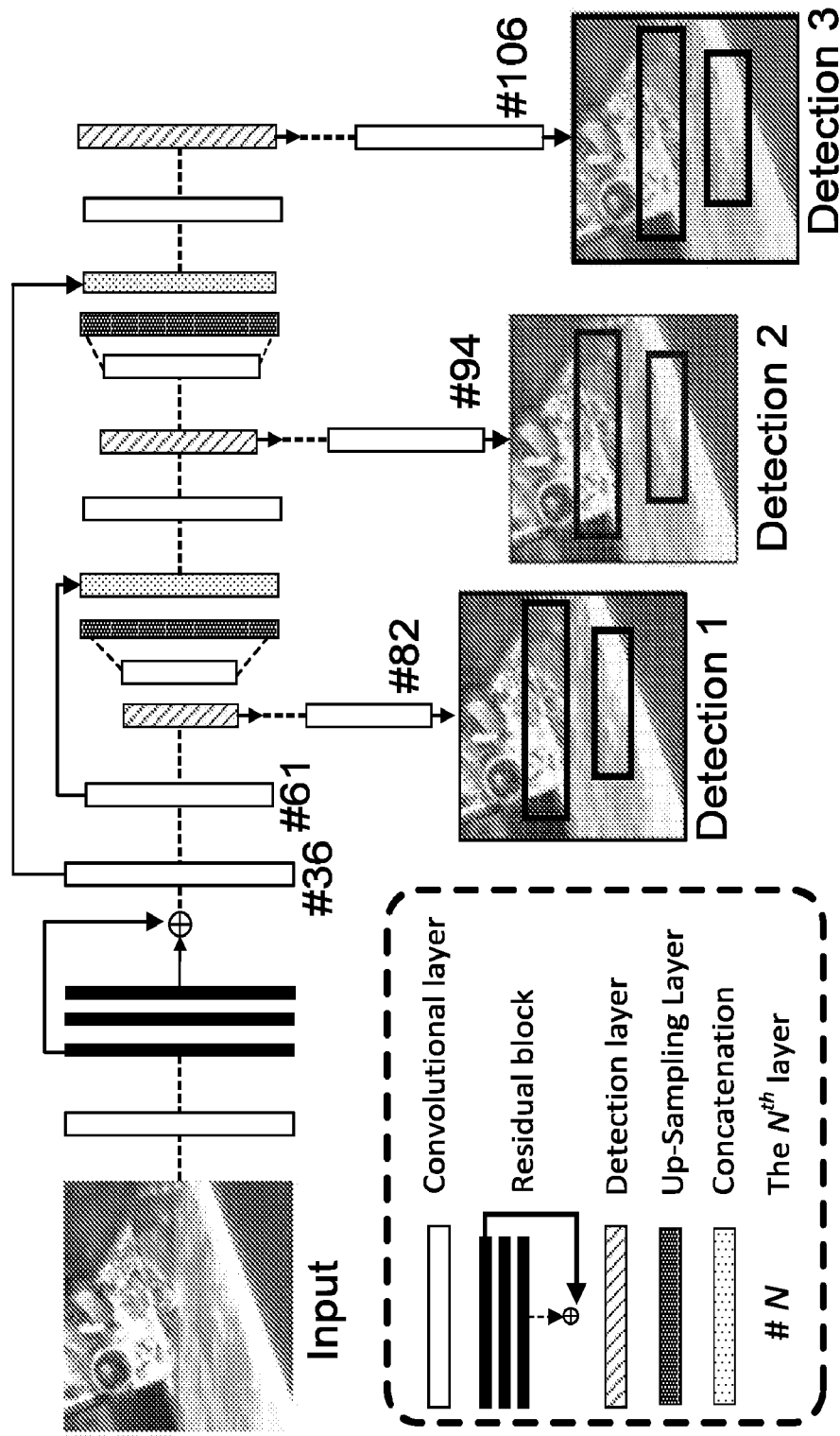
FIG. 19 shows an embodiment of a convolutional neural network architecture.

The one-stage method provides real-time object detection capability using images as input and produces predictions through bounding boxes. The one-stage method performs feature extraction using an architecture such as Darknet-53, which can be seen in FIG. 19. At the back of each detection output (image with grids), the algorithm will predict two maps. The first one has the information about the location and size of the bounding box, as four variables, plus a confidence score, one variable, describing overlap of the predicted bounding box against the labeled one, called the ground truth.

For each grid, three bounding boxes can be predicted. The second map is the distribution of class probability. Therefore, the predictions can be expressed as an N×N×(3 5+C) tensor, where N is the number of grids on each side of the square image, and C is the number of classes. In the localization embodiments here, N has three values (N=14, 28, 56 at model layer number 82, 94, and 106 correspondingly) to detect objects with different sizes through either finer or looser grids. As used here C equals three which refers to three classes in the localization problem: previous layer, over-extrusion in the current layer, and under-extrusion in the current layer. This discussion uses 'Previous-layer', 'Over-extrusion', and 'Under-extrusion' to stand for these three categories. Printing conditions in the previous layer are not included in this method because they will be covered by the current layer. Therefore, only previous layer detection is focused on to distinguish it from the current prints.

The embodiments may apply three visualization methods to present the localization results. The first one directly shows the predicted bounding boxes based on the model output tensor mentioned above. To interpret the prediction tensor as a final result, the non-maximum suppression (NMS) method may be applied to remove the redundant and inaccurate bounding boxes based on a threshold. The second method colors the grid based on an integrated score, which is defined as the element-wise product of confidence and class probability obtained from two prediction maps of the model. The integrated score represents both how well the predicted bounding box matches the ground truth and the probability of the class existing in the box. The grids at the boundary of the detected features could have a high score for correctly predicting the classes, yet have a low confidence value, which leads to a modest integrated score. In this case, grids in the middle of the features would have higher integrated scores because they have better performance in both values. The third method is known as sensitivity analysis, which evaluates the model's local gradient and determines the location of the input image that is most sensitive. The gradient may be evaluated at each pixel of the input image through backpropagation of the model output. By setting a threshold for the gradient, high sensitivity areas can be displayed on the input images.

Using the localization method above, rough spatial information of the defects can be obtained. However, the bounding box may not provide accurate detection of the area of interest. Therefore, the process may apply a semantic segmentation method to recognize the exact content of the image including the condition, such as good quality or anomalies, the location, and the number of defects. The basic idea of semantic segmentation involves using an encoder network such as fully convolutional networks (FCN) or deep convolutional neural networks (DCNN) to generate a pixel-wise prediction and then decode it to a masked segmentation image.

Figure 20:
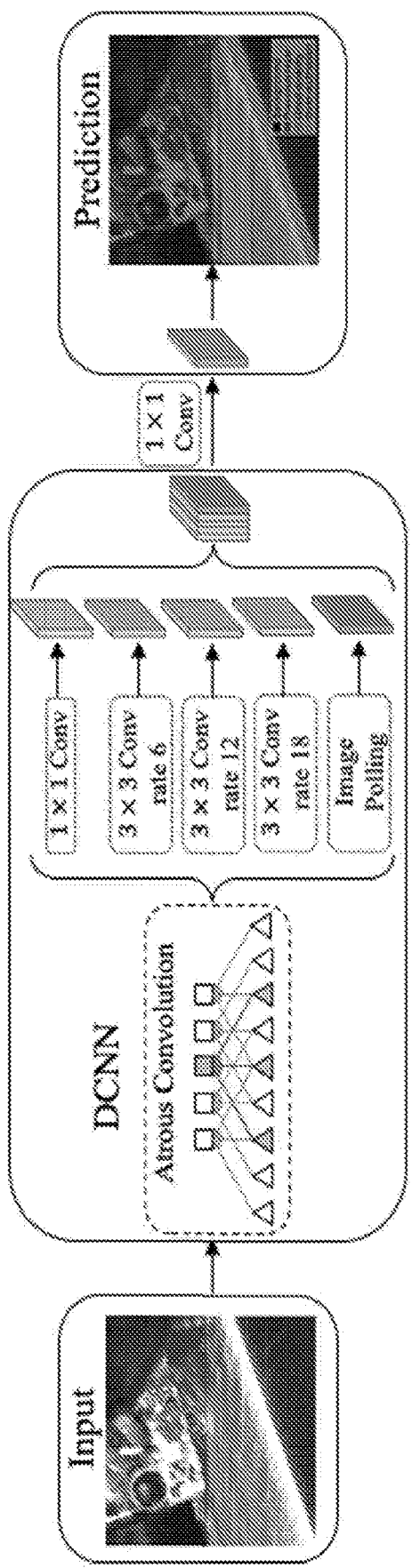
FIG. 20 shows an alternative view of an embodiment of a convolutional neural network architecture.

The embodiments use a new architecture that may be referred to as "DeepLabv3" shown in FIG. 20. The pooling and down-sampling operations in the normal DCNN would cause a serious reduction in spatial information. Therefore, atrous convolution with different sampling rates are proposed to re-scale the vision field and maintain the resolution. The output of the model is a matrix with a pixel-wise prediction of the category. Each element in the matrix represents the classification result of the corresponding pixel in the image using a normalized array in which summation of the elements in the array equals 1, via the Softmax operation, indicating the possibility of belonging to each class. The output classes are set to five in this problem, which are 'Background', 'Previous-layer', 'Good-quality', 'Over-extrusion', and 'Under-extrusion'. It is important to note that in the semantic segmentation problem 'Background' category is added due to the working principle of the task to classify the image into pixel level and class. An additional category of 'Good-quality' is augmented, compared to the categories of the localization problem, to detect the change of printing conditions in the current layer.

The embodiments here may use a system similar to those shown in FIGS. 1a-b. To create uniform mechanical properties of the final products, two orthogonal printing directions are set up with one direction for odd layers and the other for even layers. After that, different flow rates are manually adjusted to create two types of quality conditions, such as over-extrusion or under-extrusion, in both even and odd layers. The first type starts from good-quality, then turns into over-extrusion and finally changes back to good-quality, while the second type follows the same process with the under-extrusion defect. Although over and under-extrusion defects can form as a result of multiple process parameters such as print speed or layer height, it is mainly caused by the improper rate of material extrusion, flow rate, as discussed above.

Due to the fact that defects can be more local and not uniformly distributed, the extent of intra-layer defects in the training data is changed by adjusting the flow rate. Therefore, the method is capable of mimicking the actual defects that may occur in real-time printing conditions. By printing several rectangular sheets of 100 mm×25 mm×0.6 mm, for 3 layers, under the above procedures, 20,000 images are recorded during the process. Among them, 1,400 images containing quality transitions are selected as the entire image data set. To be identified as a quality transition, an image must contain two or more printing quality conditions.

With the selected images, a fixed square window is applied to extract 448×448 pixels images with the print nozzle located in the center. Since there are two orthogonal printing directions in the process, a single printing direction for all the odd layers and an orthogonal direction for all the even layers, the square window has two orientations during the extraction of input images for odd or even layers. Lastly, 20% of the whole image data set is randomly chosen as testing data, and the remaining images are treated as training data. After preparing the whole raw data set, images are then labeled for localization and segmentation tasks in two different ways.

For the localization problem, rectangular bounding boxes are used to label the three types of conditions of interest. Here, the coordinates of the bounding box and their categories are recorded. For the segmentation problem, polygons are drawn on the images to create masks for the five categories and each pixel will be allocated a category. During labeling, constant judgment based on image features is kept to distinguish the anomalies from good quality.

To locate the position of the defect in the image, a bounding box is used to mark the information. Therefore, the task of the machine learning model is to predict the location and size of the bounding box from the input image. As mentioned above, a modified one-stage network and a pre-trained model are applied to this task. The training process continues for 9,000 epochs until the loss converges. The training results are evaluated through mean accuracy precision (mAP), which measures the performance of an object detection method. In order to get mAP, accuracy precision (AP) for each class is needed. The term is further calculated as the area under the interpolated precision-recall curve shown in FIG. 21.

Figure 21:
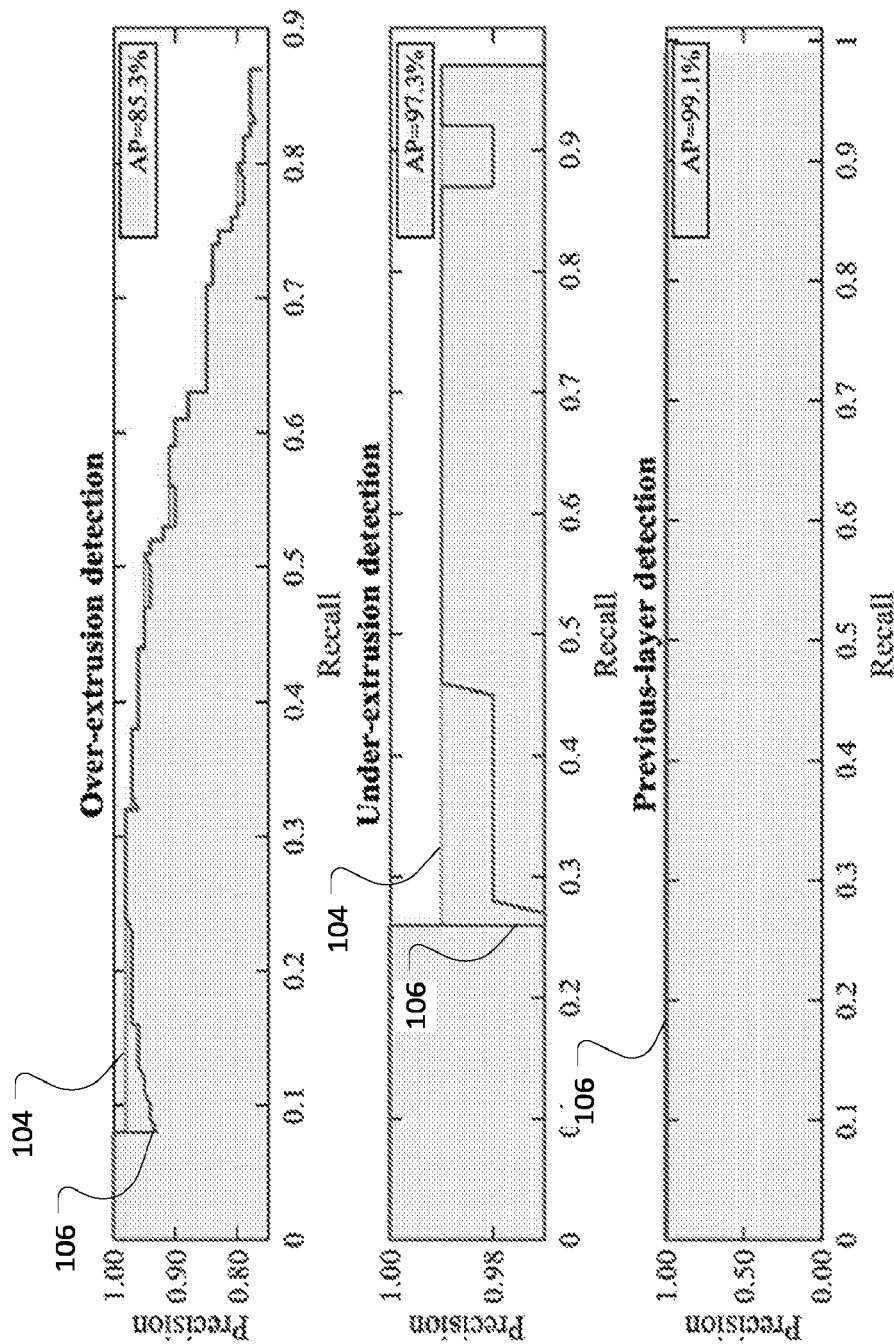
FIG. 21 shows graph of results of precision and recall.

Note, the curves 104 are the interpolated smoothing of the curves 106, and the shaded area below the curve 104 represents the accuracy precision. The precision (P) and recall (R) can be calculated based on the following equations: $P=TP/S_1$ and $R=TP/S_2$. Here, $S_1$ stands for the total number of detected bounding boxes and $S_2$ represents the total number of bounding boxes in the dataset. True positive (TP) represents the number of correctly detected bounding boxes, which have the right detection of a category and IOU larger than 50%. Intersection of union (IOU) refers to the overlap area of the predicted bounding box divided by the union of ground truth and prediction. A threshold of 50% is chosen according to the general rule of bisection and consistency of the threshold to compare among other models. A higher threshold baseline means a more restricted condition for a correctly detected case. Finally, the accuracy precision for three categories based on the testing data set are shown in FIG. 21 with its value shown in the legend. Therefore, the model's mAP can be calculated as the mean value of the AP results, achieving a performance of 93.9%. A summary of the training results for the localization model is also presented in Table 4.

TABLE 4

| Metric | Precise Localization (%) | | | | Semantic Segmentation (%) | |
| --- | --- | --- | --- | --- | --- | --- |
| | $AP_1$ | $AP_2$ | $AP_3$ | mAP | PA | mIOU |
| Performance | 85.30 | 97.30 | 99.10 | 93.90 | 97.60 | 92.10 |

Figure 22:
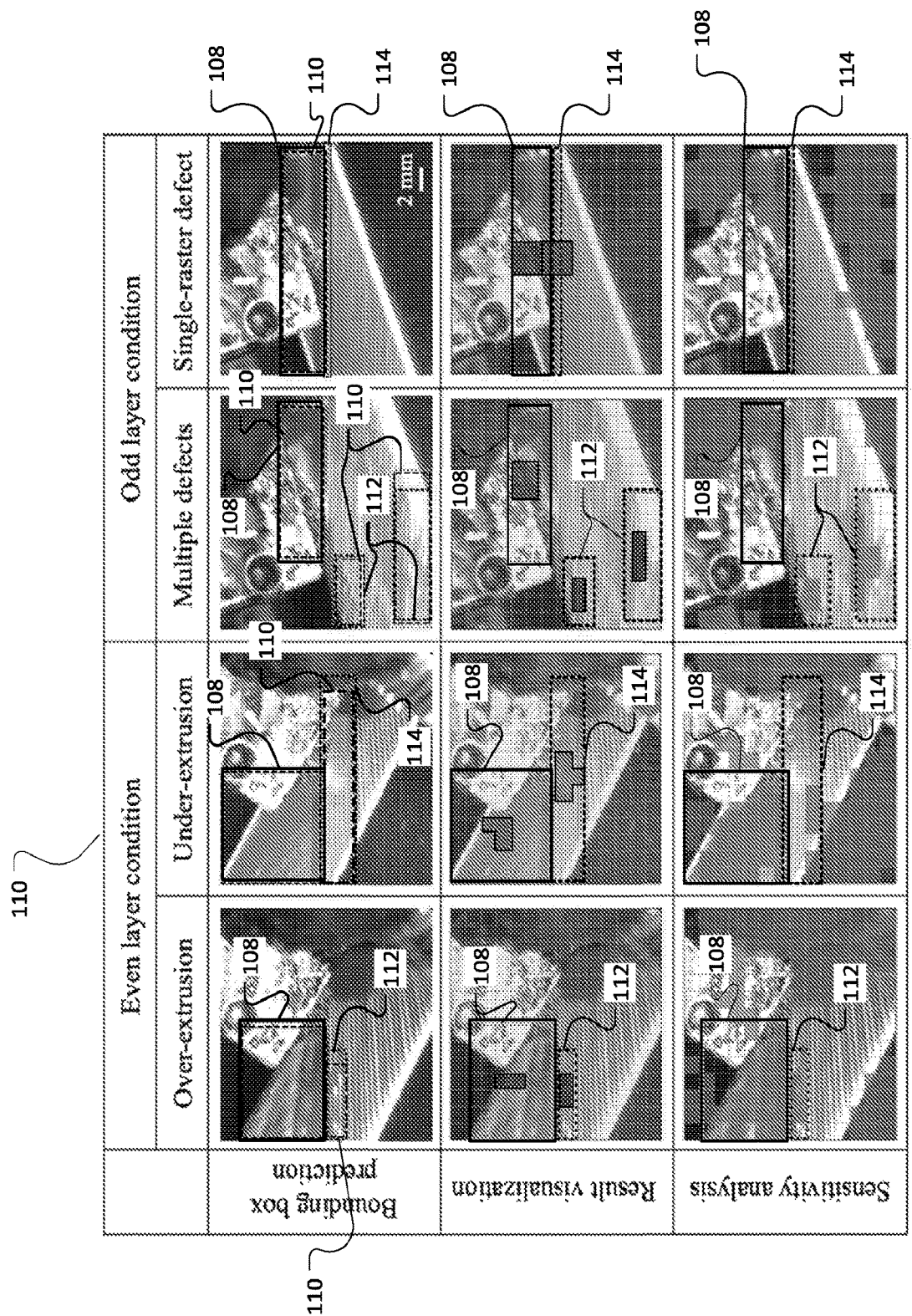
FIG. 22 shows typical images under different categories.

The evaluation metric mAP discussed above shows the overall performance of the applied model. In order to give an intuitive and clear display, typical images under different categories are analyzed and shown in FIG. 22. In FIG. 22, boxes labeled 108 are predicted previous layer, boxes 110 are ground truth, boxes 112 are predicted over extrusion, and boxes 114 are predicted under extrusion. The 'Result visualization' row shows how well the model predicts the category and location of the cases. As mentioned in the second section, the model will conduct an output at each YOLO detection layer. Here, the first prediction at model layer 82 with a stride of 32 (14×14 grids) is studied for its appropriate resolution for visualization. The matrices are further normalized to (0, 1) interval for standardization.

As mentioned in the previous paragraph, the integrated score is defined as the product of confidence and class probability. The maximum product among the three predictions determines the value of each grid. Since both confidence and class probability are viewed as correctly predicted if the value exceeds 0.5, a threshold of the integrated score is set as 0.5×0.5=0.25. Grids with a value larger than 0.25 will be colored, which means the grid has a higher possibility to correctly predict both the class and the location of the bounding box. As shown in the 'Result visualization' row of FIG. 22, the colored grids are all located around the center of the bounding box giving a consistent match between results and theory.

Sensitivity analysis may be applied to visualize the high gradient location on input images. Note, each pixel has three gradient values for the image. The average of the three R, G, B channels determines the overall gradient of the pixel. The image is further divided into 14×14 grids to maintain display clarity and consistency. The gradient of the grid is defined as the mean value of all the pixels within that grid. The grid will be colored in grey if the value exceeds a certain threshold as shown in the last row of FIG. 22. Sensitivity analysis highlights the area based on the gradient evaluation at each pixel of the input image. A pixel with a larger gradient indicates that it has a higher sensitivity in the classification task rather than a larger probability in a certain category. Therefore, there are no governing rules on setting the threshold. Hence, an appropriate and fixed value of a threshold that satisfies the majority of the testing images is applied in the visualization of the sensitivity analysis. The heat maps representing the sensitivity may be spatially discrete and distributed at the boundary of the digits. Similarly, the high sensitivity grids (shaded in grey) also lie in the background, outside of the prints boundary, as well as at the intersection line between the previous and current layer. The distribution of the shaded grids implies that these areas have a greater impact on the output of the model, which is consistent with the individual's subjective perception, that edges and boundaries are normally the priority area to focus on.

Although the localization detection is able to provide a loose location of the defect, large amounts of useless information such as the print bed background and the print nozzle are retained due to the rectangular bounding box shape. Therefore, semantic segmentation is applied to obtain a more precise detection of the defect using polygons to mask the desired area. As mentioned above, a modified DeepLabv3 architecture and a pre-trained model are applied.

Figure 23:
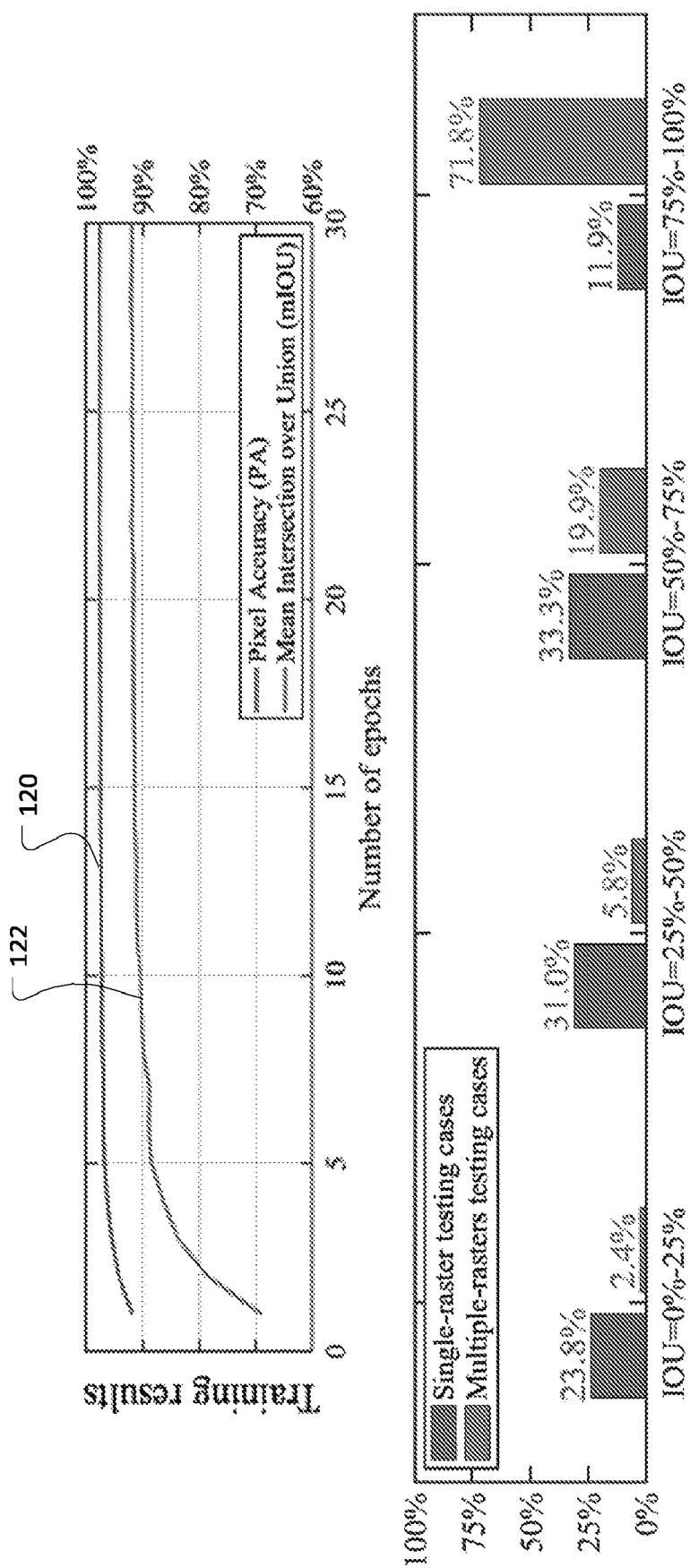
FIG. 23 shows graphs of data on training results.

With the retrained model, all the weight matrices except for the last layer will be fixed and the training results converge quickly after 15 epochs shown in FIG. 23. Two metrics are studied to evaluate the performance of the segmentation model, which are pixel accuracy (PA) 120 and mean intersection over union (mIOU) 122. Since semantic segmentation focuses on pixel-wise classification, pixel accuracy is the percentage of correctly predicted pixels over the total number of pixels (448×448). To obtain mIOU, intersection over union (IOU), which is the overlap area of the predicted mask and the ground truth divided by the union of the two areas, is first calculated for each class. The average value over all five classes is the mIOU of the model. After 30 epochs of training, both PA and mIOU converge and reach 97.6% and 92.1% respectively as shown in FIG. 23. The training results of the semantic segmentation model are also listed above in Table 1. The training results show that the semantic segmentation model is able to detect the category correctly and accurately at the pixel level.

Figure 24:
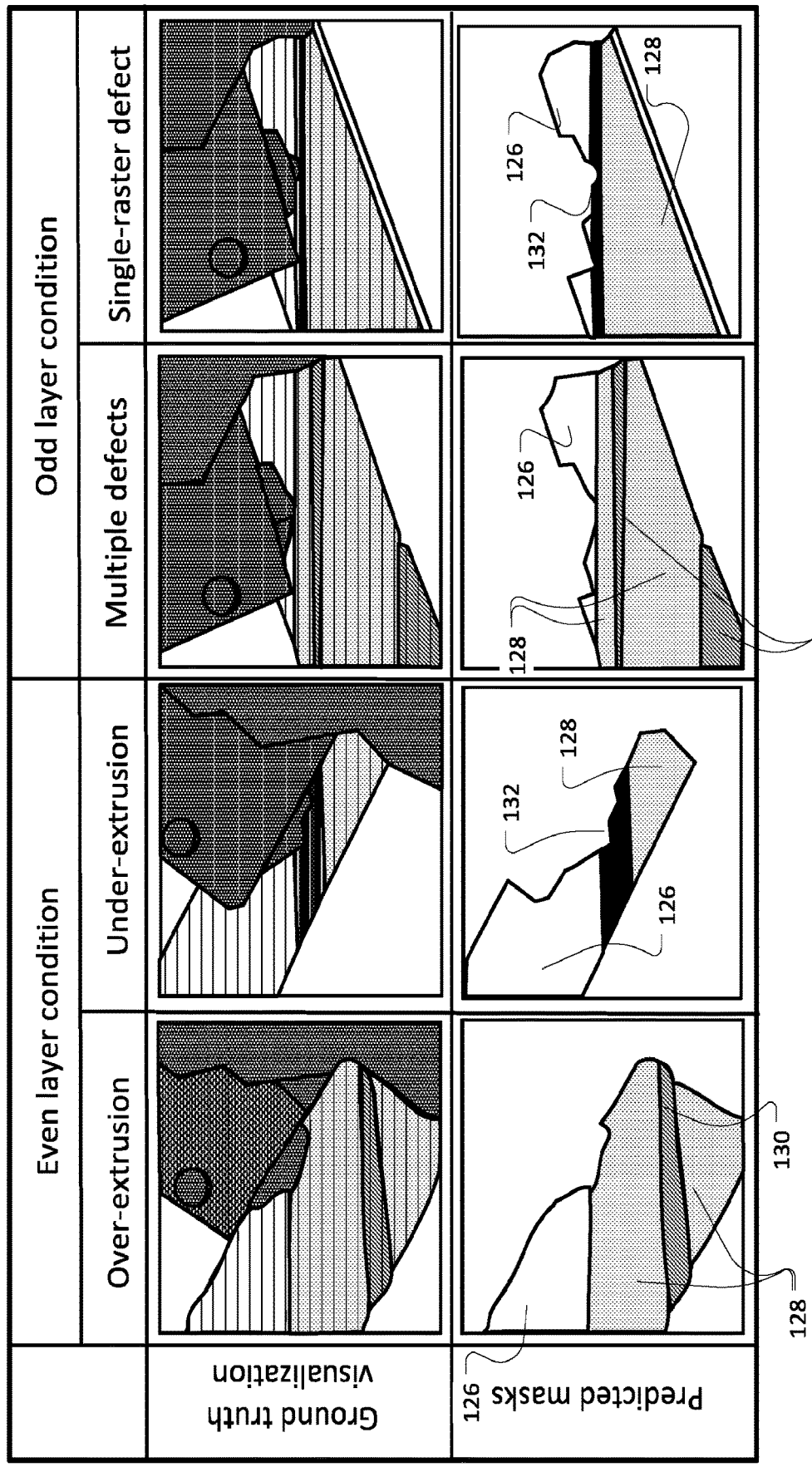
FIG. 24 shows embodiments of masking layers in images.

To present the results in a more intuitive sense, four typical images with different defect information are shown in FIG. 24. In the figure, each layer is identified with a different reference number. Label 126 is a previous layer, a good quality layer labeled as 128, under extrusion with 132, and over extrusion as 130. In the first row, the ground truth is labeled on the original image with the different numbers representing each category. In the second row, the predicted outputs are masked using the same number scheme and show a significant match compared to the ground truth. As mentioned in the introduction section, one major objective of the semantic segmentation is to reduce the time latency of detecting the defect. Therefore, more attention is focused on the single-raster case, the rightmost column of FIG. 24, which is present at the transition period. Specifically, it refers to the single raster that is currently being printed has a different quality from the previous rasters in the same layer. Multiple-rasters refer to images with quality change over several lines of raster, such as the "Under-extrusion" case in the even layer condition of FIG. 24.

Among the testing data set, 42 images are under the single-raster condition and the remaining have multiple rasters case. As shown in FIG. 23, the IOU performance on single-raster cases primarily lies in the range of 0% to 75%; however, the results shift to a higher percentage (50%-100%) for multiple-raster cases, with single-raster cases shown on the left side of each pair, and the multiple-raster cases on the right. This implies that the model has lower confidence in accurately locating the position of the single-raster; however, during the actual testing, even if a low percentage of IOU is detected, the prediction still signals that quality transition is occurring and actions should be taken if the IOU keeps increasing. The detection of existence has response time within one second and judgment can be validated in the following two or three seconds. This fast reaction capability provides more efficient feedback to realize the automatic control of the printing system.

Both embodiments mentioned above show the capability of detecting defects locally in the view of the camera. In order to analyze and fix the defects, exact global coordinates in the actual prints are more practical for further correction and examination. Therefore, the image stitching method is applied to fulfill the global recombination of the images. During the fabrication process within one layer for complex print geometries, the printing is conducted in multiple regions which leads to the extruder nozzle jumping across the piece, which in turn creates discontinuities in the images. Thus, image alignment methods based on consecutive images and feature extraction are not applicable. Instead, with the known global coordinates of the nozzle, affine transformations can be calculated and applied to every local image, mapping them to the global frame.

Figure 25:
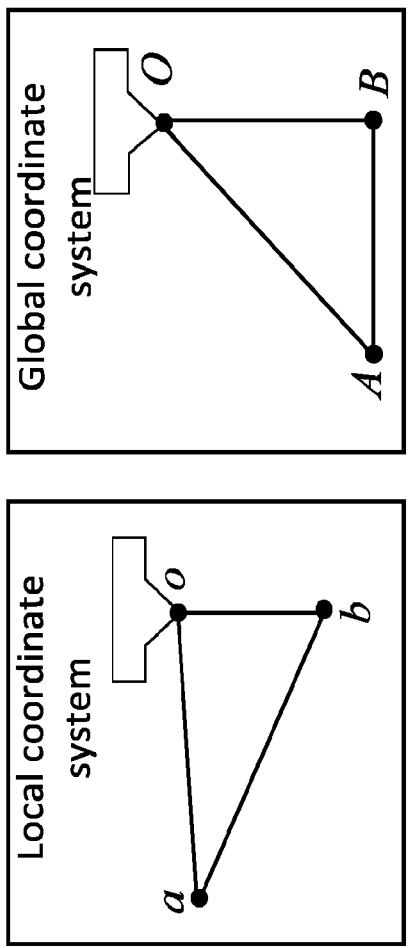
FIG. 25 shows pictorial representations of coordinate systems.

A schematic diagram illustrating the affine transformation is shown in FIG. 25. A standard right triangle is printed with the right-angle side L mm and parallel to the edge of the print bed. Since the information of the nozzle location can be obtained from the printer, we can assume its global coordinates are denoted as $(O_X, O_Y)$, the other two vertex coordinates can be expressed as $A(O_X-L, O_Y)$, $B(O_X, O_Y+L)$. Meanwhile, the same three points can also be written as $o(o_x, o_y)$, $a(a_x, a_y)$ and $b(b_x, b_y)$ in local image coordinates. Therefore, the affine transformation can be expressed in the following equation:

$$\begin{bmatrix} O_X \\ O_Y \\ A_X \\ A_Y \\ B_X \\ B_Y \end{bmatrix} = \begin{bmatrix} O_X \\ O_Y \\ O_X - L \\ O_Y \\ O_X \\ O_Y + L \end{bmatrix} = \begin{bmatrix} A & 0 & 0 \\ 0 & A & 0 \\ 0 & 0 & A \end{bmatrix} \begin{bmatrix} o_x \\ o_y \\ a_x \\ a_y \\ b_x \\ b_y \end{bmatrix} + \begin{bmatrix} B \\ B \\ B \end{bmatrix}, \quad (1)$$

where $A = \begin{bmatrix} A_{11} & A_{12} \\ A_{21} & A_{22} \end{bmatrix}$, $B = \begin{bmatrix} b_1 \\ b_2 \end{bmatrix}$, and $\underline{0}\begin{bmatrix} 0 & 0 \\ 0 & 0 \end{bmatrix}$.

Since all six points are neither collinear nor coincident, and bijection mapping is followed, a unique solution to the affine matrix A and bias B exists. Any point (x', y') in the local image frame with a new nozzle coordinate $O(O_X', O_Y')$ can be written in the global coordinate (x', y') as follows:

$$\begin{bmatrix} x' \\ y' \end{bmatrix} = \begin{bmatrix} A_{11} & A_{12} \\ A_{21} & A_{22} \end{bmatrix} \begin{bmatrix} x \\ y \end{bmatrix} + \begin{bmatrix} b_1 \\ b_2 \end{bmatrix} + \begin{bmatrix} O_X' - O_X \\ O_Y' - O_Y \end{bmatrix}. \quad (2)$$

Figure 26:
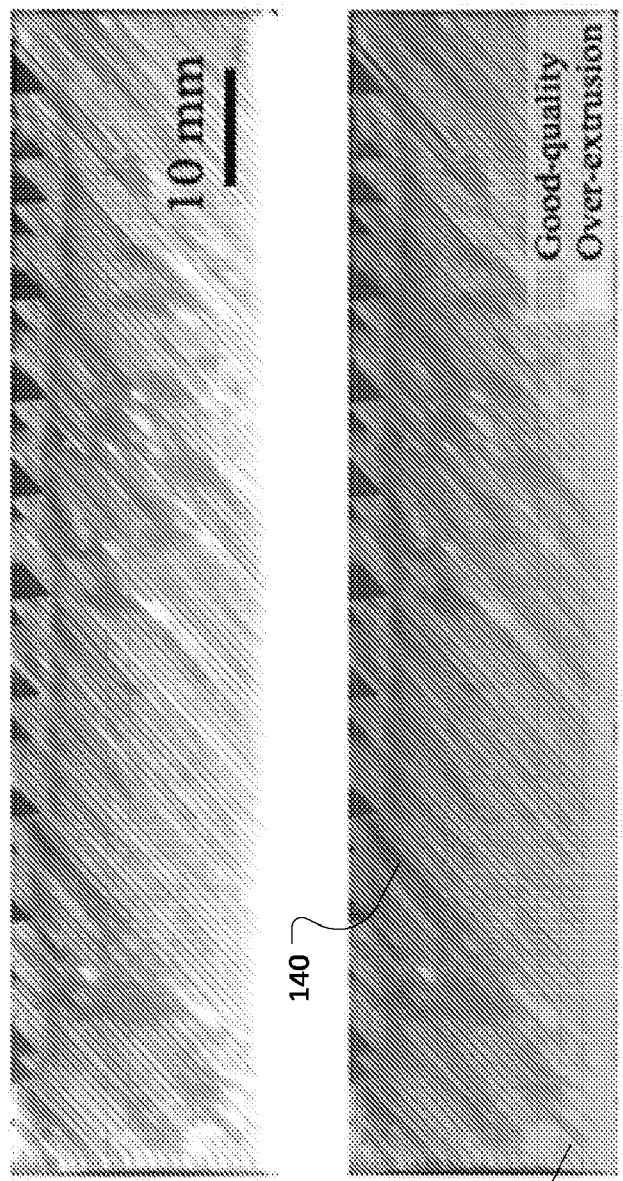
FIG. 26 shows a raw image and regions of predictions.

Since the global view can be directly applied to the top layer of the prints afterward, attention is primarily focused on an internal layer in this section. After getting the affine matrix, an internal even layer extrusion sample is analyzed as follows. The raw image is displayed by stitching the transformed images together in the global frame shown in FIG. 26. For the overlapping area, images behind this area would cover the previous features. The indented triangles at the top of the image are shadows created by the sensors near the nozzle. The local images at the top edge are all affected by this problem. Adding a more uniform light source is believed to remedy this deficiency. With the trained semantic segmentation model, predictions can be obtained from every local image and follow the same affine transformation procedure. However, in terms of overlapping, the prediction of the pixel is determined by the highest category probability among the overlapped images, where the probability of each category at one pixel is mentioned in Section 2. The final prediction results in the global view are presented in FIG. 26 showing the 'Over-extrusion' region in yellow as shown at 142 and the 'Good-quality' area in green as shown at 140.

Since the post-processing layer-wise quality profile aims to provide an efficient visualization of segmentation results in the global framework, labeling the ground truth of thousands of local input images are not practical in the actual printing process. Moreover, for internal layer cases, labeling ground truth on a rebuilt global image can involve errors and inconsistent labeling settings. In the current study, the efficacy of the method is evaluated based on the detection of features from visual inspection. In this case, the prediction of semantic segmentation model on layer-wise quality profile matches the features of the over-extrusion defect such as bulges or raised rasters located in the middle part and corner of the prints. In the future, intermediate steps will be added to pause the printing process during the layer transition for image capturing.

Overall, global visualization provides a comprehensive understanding of the physical location of the defects, especially internally, which makes the examination and correction easier to locate the area of interest. The global prediction mapping to the physical prints rebuilt from local images bridges the gap between the model output (plain numbers) and actual defects, thereby realizing a real-time and layer-wise anomaly detection in the quality control of additive manufacturing processes.

The embodiments above include two advanced real-time detection methods to precisely locate the area of interest during the printing process both in the local and global frameworks. Mean average precision reaches 93.9% for the localization model and mean intersection over union achieves 92.1% for semantic segmentation. Typical images are also displayed using three visualization methods to verify and understand the high accuracy of prediction results. The layer-wise quality profile rebuilds the local images in their entirety and is able to assess the in-plane defects internally. Additionally, a single-raster condition in the segmentation task is exclusively studied and analyzed to demonstrate the capability of detecting new printing conditions in-situ and in real-time.

One should note that while the localization and semantic segmentation approaches are discussed in terms of the intra-layer defects discussed initially, this enhanced methodology may also apply to inter-plane defects. No limitation to any particular detection and correction is intended, nor should any be implied.

In this manner, the embodiments demonstrate an autonomous FDM 3D-printing platform which can in-situ monitor and adjust printing conditions based on a trained machine learning algorithm. The embodiment algorithms are able to achieve above 98% accuracy in predicting the printed part status quality. Additionally, the response rate of the system reaches or even surpasses the human reaction and the model is able to recognize inferior images that humans will have a difficult time to distinguish with high accuracy. The framework of these embodiments to detect and self-correct systems in FDM technologies may be applied to other materials and manufacturing systems to reliably 3D-print high-performance materials especially in challenging environments without human interaction.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A system to perform autonomous additive manufacturing, comprising:
   a three-dimensional fused filament deposition modeling printer having a source of material, a nozzle connected to the source of material, and a print bed, the printer configured to deposit the material from the nozzle onto the print bed;
   a video camera focused on a print region below the nozzle;
   a camera mount to attach the video camera to the printer, the camera mount fixed on top of an extruder cap of the printer, the camera mount configured to provide the camera a fixed view adjacent the print bed when mounted;
   a fan having a mount, the mount having been modified to allow the camera mount to be positioned to provide the camera with a viewing angle of the print bed; and
   at least one processing element to execute instruction that cause the processor to:
      receive video of printed layer in the print region below the nozzle from the camera;
      transform the video to individual images;
      access a convolutional neural network to use the individual images to obtain a print condition, the print condition being one or more of under extrusion, and over extrusion; and
      adjust the operation of the printer by changing printing parameters based upon the print condition.

2. The system of claim 1, wherein the processing element comprises at least one field programmable gate array.

3. The system of claim 1, wherein the convolutional neural network comprises one of a group consisting of: a deep convolutional neural network, a residual convolutional neural network, or a fully convolutional network.

4. The system of claim 1, wherein the convolutional neural network comprises a deep convolution neural network with atrous convolution structures.

5. The system of claim 1, wherein the convolutional neural network comprises a residual neural network.

6. The system of claim 1, wherein the convolutional neural network is configured to produce one of a group consisting of: either a three element vector, or a four element vector.

7. The system of claim 1, wherein the custom camera mount includes an attachment for a cooling fan.

* * * * *